(12) United States Patent
Delregno

(10) Patent No.: US 9,025,605 B2
(45) Date of Patent: *May 5, 2015

(54) APPARATUS AND METHOD FOR PROVIDING A NETWORK TERMINATION POINT

(75) Inventor: Christopher N. Delregno, Rowlett, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 209 days.

This patent is subject to a terminal disclaimer.

(21) Appl. No.: 13/205,341

(22) Filed: Aug. 8, 2011

(65) Prior Publication Data

US 2011/0292948 A1 Dec. 1, 2011

Related U.S. Application Data

(63) Continuation of application No. 11/141,374, filed on May 31, 2005, now Pat. No. 8,340,102, which is a continuation-in-part of application No. 10/858,491, filed on Jun. 1, 2004, now Pat. No. 8,218,569.

(60) Provisional application No. 60/560,009, filed on Apr. 5, 2004.

(51) Int. Cl.
*H04L 12/56* (2011.01)
*H04L 12/28* (2006.01)
(Continued)

(52) U.S. Cl.
CPC ........ *H04L 12/2889* (2013.01); *H04L 12/4633* (2013.01); *H04L 45/10* (2013.01); *H04L 45/50* (2013.01); *H04L 47/10* (2013.01); *H04L 49/602* (2013.01); *H04M 7/006* (2013.01)
USPC .......................... 370/395.5; 370/466; 370/469

(58) Field of Classification Search
CPC ...................................................... H04L 45/68
USPC ......... 370/352–356, 386–388, 395.5, 395.51, 370/395.52, 395.53, 396–399, 400, 401, 370/412–418, 422–426, 466, 469
See application file for complete search history.

(56) References Cited

U.S. PATENT DOCUMENTS 5,159,592 A * 10/1992 Perkins .......................... 370/338
5,412,647 A 5/1995 Giroux et al.
(Continued)

FOREIGN PATENT DOCUMENTS

EP 0975192 1/2000
EP 1065858 1/2001
(Continued)

OTHER PUBLICATIONS

"IEEE Standards for Local and Metropolitan Area Networks: Virtual Bridged Local Area Networks," XP-002240505, ISBN 0-7381-1537-1, Institute of Electrical and Electronics Engineers, Inc., 90 pages, 1Q 1998.

(Continued)

*Primary Examiner* — Hoon J Chung

(57) ABSTRACT

Apparatus and method for providing a termination point for service emulation instances in an access network is provided. In an embodiment, the service emulation instances are implemented utilizing, for example, pseudowires. Communications to and from the access network are aggregated and transmitted via one or more pseudowires to a service emulation instance terminator. The service emulation instance terminator converts the traffic to its native form and, if necessary, converts the traffic to a different type of format or service. The service emulation instance terminator then frames the traffic for the appropriate type of service and transmits the traffic to the service edge. Traffic received from the service is removed prepended with a pseudowire label and aggregated with other traffic. The aggregated traffic is transmitted to the customer via the access network. If necessary, an interworking function may convert the traffic from one type of service to another type of service. Further, functionalities of equipment such as frame relay switching or Asynchronous Transfer Mode (ATM) switching may be realized in the service emulation instance terminator.

20 Claims, 11 Drawing Sheets

(51) Int. Cl.
  *H04L 12/46* (2006.01)
  *H04L 12/751* (2013.01)
  *H04L 12/723* (2013.01)
  *H04L 12/801* (2013.01)
  *H04L 12/931* (2013.01)
  *H04M 7/00* (2006.01)

(56) References Cited

U.S. PATENT DOCUMENTS

| | | |
|---|---|---|
| 5,805,600 A | 9/1998 | Venters et al. |
| 5,809,021 A | 9/1998 | Diaz et al. |
| 5,910,954 A | 6/1999 | Bronstein et al. |
| 5,987,034 A | 11/1999 | Simon et al. |
| 5,999,532 A | 12/1999 | Terasaki |
| 6,205,488 B1 | 3/2001 | Casey et al. |
| 6,333,917 B1 | 12/2001 | Lyon et al. |
| 6,339,595 B1 | 1/2002 | Rekhter et al. |
| 6,381,649 B1 | 4/2002 | Carlson |
| 6,499,061 B1 | 12/2002 | Benayoun et al. |
| 6,603,756 B1 | 8/2003 | Tappan |
| 6,634,297 B2 | 10/2003 | Poetter et al. |
| 6,636,512 B1 | 10/2003 | Lorrain et al. |
| 6,643,297 B1 | 11/2003 | Sproat et al. |
| 6,731,649 B1 | 5/2004 | Silverman |
| 6,735,187 B1 * | 5/2004 | Helander et al. ............... 370/338 |
| 6,775,283 B1 | 8/2004 | Williams |
| 6,778,494 B1 | 8/2004 | Mauger |
| 6,870,812 B1 | 3/2005 | Kloth et al. |
| 6,898,213 B1 | 5/2005 | Shimelmitz et al. |
| 6,904,061 B2 | 6/2005 | Schmitt et al. |
| 6,934,250 B1 | 8/2005 | Kejriwal et al. |
| 6,944,168 B2 | 9/2005 | Paatela et al. |
| 6,950,393 B1 | 9/2005 | Ben Nun et al. |
| 6,963,561 B1 | 11/2005 | Lahat |
| 6,977,932 B1 | 12/2005 | Hauck |
| 6,985,488 B2 | 1/2006 | Pan et al. |
| 7,031,312 B1 | 4/2006 | Jayakumar et al. |
| 7,031,607 B1 | 4/2006 | Aswood Smith |
| 7,068,654 B1 | 6/2006 | Joseph et al. |
| 7,092,389 B2 | 8/2006 | Chase et al. |
| 7,120,151 B1 | 10/2006 | Ginjpalli et al. |
| 7,126,907 B2 | 10/2006 | Carpini et al. |
| 7,130,261 B1 | 10/2006 | Skrzynski et al. |
| 7,164,692 B2 | 1/2007 | Cox et al. |
| 7,227,867 B1 | 6/2007 | Ferguson et al. |
| 7,289,538 B1 | 10/2007 | Paradise et al. |
| 7,330,481 B2 | 2/2008 | Jones et al. |
| 7,411,904 B2 | 8/2008 | Foote et al. |
| 7,463,639 B1 | 12/2008 | Rekhter |
| 7,480,306 B2 | 1/2009 | Unbehagen et al. |
| 8,218,569 B2 * | 7/2012 | DelRegno et al. ............. 370/466 |
| 8,340,102 B2 * | 12/2012 | Delregno .................. 370/395.5 |
| 2001/0036172 A1 | 11/2001 | Haskal |
| 2002/0075542 A1 | 6/2002 | Kumar et al. |
| 2002/0078384 A1 * | 6/2002 | Hippelainen ................ 713/201 |
| 2002/0085563 A1 | 7/2002 | Mesh et al. |
| 2002/0114274 A1 | 8/2002 | Sturges et al. |
| 2002/0126633 A1 | 9/2002 | Mizutani et al. |
| 2002/0131408 A1 | 9/2002 | Hsu et al. |
| 2002/0146026 A1 | 10/2002 | Unitt et al. |
| 2002/0150100 A1 | 10/2002 | White et al. |
| 2002/0152319 A1 | 10/2002 | Amin et al. |
| 2002/0163935 A1 | 11/2002 | Paatela et al. |
| 2002/0167949 A1 | 11/2002 | Bremer et al. |
| 2002/0176139 A1 | 11/2002 | Slaughter et al. |
| 2003/0012184 A1 | 1/2003 | Walker et al. |
| 2003/0016672 A1 | 1/2003 | Rosen et al. |
| 2003/0021287 A1 | 1/2003 | Lee et al. |
| 2003/0026206 A1 | 2/2003 | Mullendore et al. |
| 2003/0043830 A1 | 3/2003 | Floyd et al. |
| 2003/0056006 A1 | 3/2003 | Katsube et al. |
| 2003/0112756 A1 | 6/2003 | Le Gouriellec et al. |
| 2003/0145246 A1 | 7/2003 | Suemura |
| 2003/0147352 A1 | 8/2003 | Ishibashi et al. |
| 2003/0147412 A1 | 8/2003 | Weyman et al. |
| 2003/0185201 A1 | 10/2003 | Dorgan |
| 2003/0231640 A1 | 12/2003 | Basso et al. |
| 2004/0028051 A1 | 2/2004 | Etemadi et al. |
| 2004/0028064 A1 | 2/2004 | Cetin et al. |
| 2004/0037290 A1 | 2/2004 | Valadarsky et al. |
| 2004/0042480 A1 | 3/2004 | Sproat et al. |
| 2004/0044789 A1 | 3/2004 | Angel et al. |
| 2004/0066780 A1 | 4/2004 | Shankar et al. |
| 2004/0076166 A1 | 4/2004 | Patenaude |
| 2004/0081172 A1 | 4/2004 | Ould-Brahim |
| 2004/0081203 A1 * | 4/2004 | Sodder et al. ................. 370/469 |
| 2004/0088430 A1 | 5/2004 | Busi et al. |
| 2004/0090967 A1 | 5/2004 | Doidge et al. |
| 2004/0123232 A1 | 6/2004 | Hodges et al. |
| 2004/0153570 A1 | 8/2004 | Shobatake |
| 2004/0156313 A1 | 8/2004 | Hofmeister et al. |
| 2004/0156389 A1 | 8/2004 | Sha |
| 2004/0158626 A1 | 8/2004 | Douglas |
| 2004/0162919 A1 | 8/2004 | Williamson et al. |
| 2004/0165600 A1 | 8/2004 | Lee |
| 2004/0170160 A1 | 9/2004 | Li et al. |
| 2004/0170167 A1 | 9/2004 | Cohen |
| 2004/0170173 A1 | 9/2004 | Pan et al. |
| 2004/0174882 A1 | 9/2004 | Willis |
| 2004/0179555 A1 | 9/2004 | Smith |
| 2004/0190548 A1 | 9/2004 | Harel et al. |
| 2004/0202148 A1 | 10/2004 | Kuehnel |
| 2004/0208198 A1 | 10/2004 | Christie et al. |
| 2004/0213232 A1 | 10/2004 | Regan |
| 2004/0221051 A1 | 11/2004 | Liong et al. |
| 2004/0246891 A1 | 12/2004 | Kay et al. |
| 2004/0252717 A1 | 12/2004 | Solomon et al. |
| 2004/0255028 A1 | 12/2004 | Chu et al. |
| 2005/0002333 A1 | 1/2005 | Aalders et al. |
| 2005/0044262 A1 | 2/2005 | Luo |
| 2005/0047341 A1 | 3/2005 | Kim et al. |
| 2005/0141504 A1 | 6/2005 | Rembert et al. |
| 2005/0147104 A1 | 7/2005 | Ould-Brahim |
| 2005/0160180 A1 | 7/2005 | Rabje et al. |
| 2005/0190757 A1 | 9/2005 | Sajassi |
| 2006/0002419 A1 | 1/2006 | Cox et al. |
| 2006/0018313 A1 | 1/2006 | Oki et al. |
| 2006/0159019 A1 | 7/2006 | Buskirk et al. |
| 2006/0209840 A1 | 9/2006 | Paatela et al. |
| 2007/0274321 A1 | 11/2007 | Jonsson et al. |
| 2007/0286198 A1 | 12/2007 | Muirhead et al. |
| 2008/0159174 A1 | 7/2008 | Enomoto et al. |
| 2009/0080431 A1 | 3/2009 | Rekhter |
| 2009/0097490 A1 | 4/2009 | Sanderson et al. |
| 2011/0292948 A1 * | 12/2011 | Delregno ..................... 370/401 |

FOREIGN PATENT DOCUMENTS

| | | |
|---|---|---|
| EP | 1133121 | 9/2001 |
| EP | 1176774 | 1/2002 |
| EP | 1292083 | 3/2003 |
| WF | WO-00/54469 | 9/2000 |
| WO | WO-98/39879 | 9/1998 |
| WO | WO-00/46961 | 8/2000 |
| WO | WO-01/15386 | 3/2001 |
| WO | WO-01/67804 | 9/2001 |
| WO | WO-01/71986 | 9/2001 |
| WO | WO-01/91416 | 11/2001 |
| WO | WO-02/15475 | 2/2002 |
| WO | WO-02/51069 | 6/2002 |
| WO | WO-02/078253 | 10/2002 |
| WO | WO-03/005648 | 1/2003 |
| WO | WO-03/019873 | 3/2003 |
| WO | WO-03/075501 | 9/2003 |
| WO | WO-03/077146 | 9/2003 |
| WO | WO-2004/010656 | 1/2004 |
| WO | WO-2004/025904 | 3/2004 |

(56) References Cited

FOREIGN PATENT DOCUMENTS

| WO | WO-2004/049644 | 6/2004 |
|---|---|---|
| WO | WO-2004/102890 | 11/2004 |

OTHER PUBLICATIONS

Bonica, et al., "ICMP Extensions for MultiProtocol Label Switching (draft-bonica-icmp-mpls-02)," The Internet Society, pp. 1-10, Nov. 2000.

Bryant, et al., "PWE3 Architecture (draft-leff-pwe3-arch-01)," Pseudo-Wire Edge-to-Edge (PWE3) Working Group, The Internet Society, pp. 1-42, Nov. 2002.

Bryant, et al., "PWE3 Architecture (draft-ietf-pwe3-arch-06)," Pseudo-Wire Edge-to-Edge (PWE3) Working Group, The Internet Society, 34 pages, Oct. 2003.

Bryant, et al., "PWE3 Architecture (draft-leff-pwe3-arch-07)," Pseudo-Wire Edge-to-Edge (PWE3) Working Group, The Internet Society, pp. 1-44, Mar. 2003.

Lang, "Making the Fiber Connection," Zarlink Semiconductor Inc., Fiberoptic Product News, vol. 19, No, 2, Reed Electronic Group, pp. 15-16, Feb. 2004.

Martini, et al., "Pseudowire Setup and Maintenance Using LDP (draft-ietf-pwe3-control-protocol-06)," Network Working Group, The Internet Society, 33 pages, Mar. 2004.

Martini, et al., "Pseudowire Setup and Maintenance Using LDP (draft-ietf-pwe3-control-protocol-14)," Network Working Group, The Internet Society, 41 pages, Dec. 2004.

Martini, et al., "Transport of Layer 2 Frames Over MPLS (draft-ieff-pwe3-control-protocol-01.txt)," Network Working Group, The Internet Society, 22 pages, Nov. 2002.

Martini, et al "Transport of Layer 2 Frames Over MPLS, RFC 4906," Network Working Group, Internet Engineering Task Force (IETF), http://tools.ietf.org/html/rfc4906, 42 pages, Jun. 2007.

Nadeau, et al., "Pseudo Wire (PW) Virtual Circuit Connection Verification (draft-ietf-pwe3-vccv-02)," Network Working Group, The Internet Society, 18 pages, Feb 1, 2004.

Neogi, et al., "Design and Performance of a Network-Processor-Based Intelligent DSLAM," IEEE Network, vol. 17, No. 4, pp. 56-62, Jul.-Aug. 2003.

Pepelnjak, "MPLS and VPN Architectures, CCIP Edition," Chapter 9, MPLS/VPN Architecture Overview, five pages, May 23, 2002.

Pretty, et al., "Frame Relay Interworking with Asynchronous Transfer Mode," Global Telecommunications Conference (GLOBECOM '93), pp. 1854-1860 (vol. 3), Nov. 29-Dec. 2, 1993.

Shah, et al., "Qos Signaling for PW (draft-shab-pwe3-pw-dos-signaling-00)," PWE3 Working Group, The Internet Society, pp. 1-7, Jan. 2004.

Stein, "Pseudowire Customer Edge to Customer Edge Emulation (draft-stein-pwe3-pwce2e-00)," Pseudo-Wire Edge-to-Edge (PWE3) Working Group, The Internet Society, pp. 1-6, Oct. 20, 2003.

Walton, "Frame Relay to ATM Interworking," BT Laboratories, BT Technology Journal, vol. 16, No. 1, pp. 96-105, Jan. 1998.

Williams, "Optical Ethernet Architecture Evolution: The Logical Provider Edge," Metro Ethernet Forum, pp. 1-35, Aug. 28, 2003.

Xiao, et al., "Requirements for Pseudo-Wire Emulation Edge-to-Edge (PWE3) (draft-oetf-pwe3-requirements-08)," The Internet Society, pp. 1-20, Dec. 2003.

Zelig, et al,, "Ethernet Pseudo Wire (PW) Management Information Base (draft-ietf-pwe3-enet-mib-03)," The Internet Society, pp. 1-21, Dec. 2003.

Zelig, et al,, "Pseudo Wire (PW) Management Information Base (draft-ietf-pwe3-pw-mib-03)," The Internet Society, pp. 1-41, Jan. 2004.

Zelig, et al., "Pseudo Wire (PW) Over MPLS PSN Management Information Base (draft-ietf-pwe3-pw-mpis-mib-04)," The Internet Society, pp. 1-25. Dec. 2003.

* cited by examiner

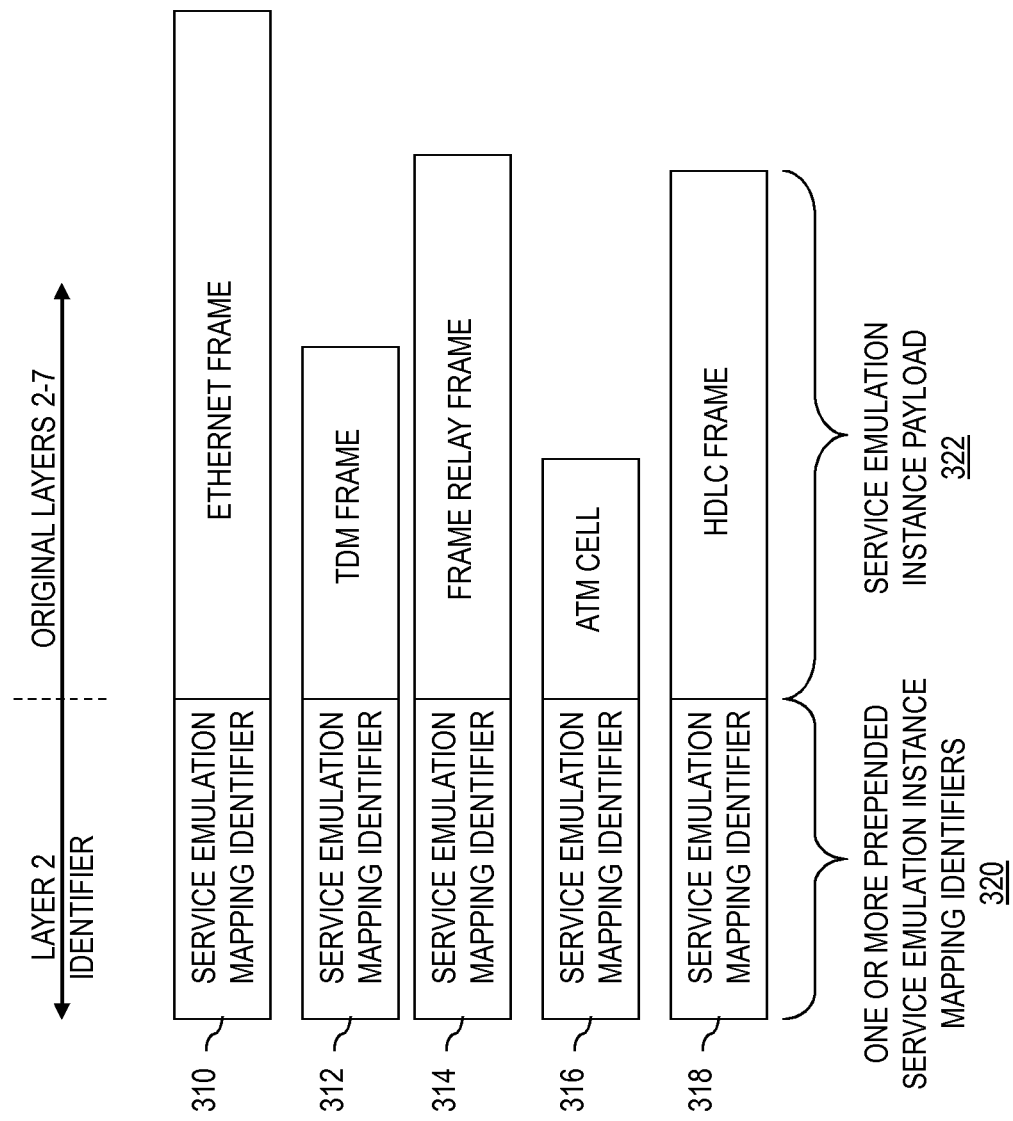

APPARATUS AND METHOD FOR PROVIDING A NETWORK TERMINATION POINT

RELATED APPLICATIONS

The present application is a continuation of U.S. patent application Ser. No. 11/141,374 filed on May 31, 2005, which is a continuation-in-part of U.S. patent application Ser. No. 10/858,491 filed on Jun. 1, 2004, which claims the benefit of priority under 35 USC 119(e) of U.S. Provisional Patent Application Ser. No. 60/560,009 filed on Apr. 5, 2004; the contents of which are hereby incorporated by reference.

FIELD OF THE INVENTION

The present invention relates generally to a system and method for providing communications services, and more particularly, to a system and method for providing a termination point for a flow in an access network.

BACKGROUND OF THE INVENTION

A commercial telecommunications network operated by a service provider supports voice and data communications between customer locations and includes an access network and a core network. Generally, customer devices communicatively couple to the access network, which in turn connects to the core network. The access network includes what many people refer to as "the last mile," that is, the connectivity from a customer location, such as an office building, to a point where a service provider has significant facilities, such as a metro hub or a "service edge" at the periphery of the core network. In contrast to the access network, the core network usually provides transport of large aggregate flows over long distances and handles the selective routing of each customer's voice and data traffic to other locations served by the network. The access network generally comprises a series of switches, aggregators, multiplexers, demultiplexers, routers, hubs, and the like which collectively serve to provide connectivity between customers' equipment and the core network.

Customer sites in the vicinity of a service provider's edge, or an intermediate hub that provides connection to the service edge, must be connected to the service edge via some form of access circuit. Traditionally, it has been more practical for a core network service provider to operate a few strategically placed facilities to serve a large number of customers in a metropolitan area rather than to extend the service provider's core network to every physical location where customers may reside. Providing access services between a customer's location and a metro hub or a service edge may involve installing electrical or optical cables between the service provider and the customer site. In some cases, the service provider installs and owns this access link connected directly to the customer location. More often, however, the existing facilities of a local telephone carrier are leased to provide this connectivity. The well-established local telephone facilities provide at least twisted-pair subscriber loop connectivity to virtually every potential customer location in a metropolitan area. In the case of larger business locations and multi-tenant commercial sites, local telephone facilities typically comprise a large quantity of telephone wires or broadband access to the sites.

The services required by customers, residential or business, vary greatly in the type of access services, bandwidth, quality of service (QoS), type of legacy equipment, and the like. Types of services typically include frame relay services, asynchronous transfer mode (ATM) services, broadband services, point-to-point private line services, voice services, and the like. Typically, the access network provides transport, aggregation, grooming, and switching for each of these types of services independently, which in turn requires the access service provider to provision each of these services separately. Each type of service utilizes different interface and framing standards, and in particular, each type of service typically utilizes different sets of protocols. As a result, current switches must be equipped to interface with and evaluate flows for each type of interface for which the switch is expected to route. Further, some types of services, such as frame relay services, may require certain types of switching equipment which may need to be replaced over time.

Accordingly, there is a need to reduce the burden associated with supporting the various types of services throughout the access network and to aggregate traffic prior to transmitting the traffic through the access network. Further, there is a need for a more efficient means of providing certain functionality of equipment that may need replacement over time.

SUMMARY OF THE INVENTION

These and other problems are generally solved or circumvented, and technical advantages are generally achieved, by embodiments of the present invention that provide a termination point for a flow in an access network and functionalities of equipment that may be realized in the termination point. The termination point provides a type of "off-ramp" for aggregated communications that may be sent between a customer site and a provider's service edge, wherein the conversions between various types of transports may be efficiently performed inside the termination point instead of requiring various hardware configurations to be located at several locations. An advantage of such a termination point is that many types of functions may be embedded in the termination point, such as a switching functionality wherein switched traffic may be encapsulated and transmitted over a core network, thus accomplishing the switching functionality in the termination point instead of a hardware switch located elsewhere, thereby affording a provider the capability to provide switching and other functionality in components other than conventional switching devices, such as frame relay switches which may need to be replaced over time.

In accordance with an embodiment of the present invention, a network device for supporting transport of an aggregated flow to a plurality of core networks is provided. The device comprises a first pseudowire endpoint configured to receive the aggregated flow, a second pseudowire endpoint in communication with one of the core networks, a switching module configured to interconnect the first pseudowire endpoint and the second pseudowire endpoint for transport of a portion of the aggregated flow to the one core network, and a framer coupled to the switching module and configured to convert another portion of the aggregated flow into a traffic flow that is native to another one of the core networks.

In accordance with another embodiment of the present invention, a method for supporting transport of an aggregated flow to a plurality of core networks is provided. The method comprises receiving the aggregated flow at a first pseudowire endpoint, switching a portion of the aggregated flow from the first pseudowire endpoint to a second pseudowire endpoint coupled to one of the core networks, and converting another portion of the aggregated flow into a traffic flow that is native to another one of the core networks.

In accordance with yet another embodiment of the present invention, a network switch for transporting an aggregated flow to a service emulation terminator is provided. The switch comprises an input port configured to receive the aggregated flow, a Layer 2 switching engine configured to switch the aggregated flow, and an output port configured to forward the aggregated flow to the service emulation terminator, wherein the service emulation terminator includes a first pseudowire endpoint configured to receive the aggregated flow, a second pseudowire endpoint in communication with one of the core networks, a switching module configured to interconnect the first pseudowire endpoint and the second pseudowire endpoint for transport of a portion of the aggregated flow to the one core network, and a framer coupled to the switching module and configured to convert another portion of the aggregated flow into a traffic flow that is native to another one of the core networks.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a diagram illustrating the use of service emulation in accordance with an embodiment of the present invention;

DESCRIPTION OF THE PREFERRED EMBODIMENT

A system, method, and software for a termination point for a flow in an access network and functionalities of equipment that may be realized in the termination point are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to embodiments in a specific context, namely, providing switching and routing services in an access network utilizing Layer 2 (Open System Interconnection (OSI) Data Link layer) service emulation instances. The present invention may also be applied, however, to other types of devices, networks, communications links, and the like. Furthermore, while specific network configurations are illustrated and discussed herein, it is noted that network configurations may vary to include fewer or additional elements, such as routers, gateways, bridges, asynchronous transfer mode (ATM) switches, frame relay switches, firewalls, switches, and the like. The illustrated embodiments are provided only for illustrative purposes and only to aid in the explanation and understanding of the concepts of the present invention. Aspects of the present invention are equally applicable to many types and configurations of networks and communications protocols.

It is further noted that, unless indicated otherwise, all functions described herein may be performed in either hardware or software, or some combination thereof. In an embodiment, the functions are performed by a processor such as a computer or an electronic data processor in accordance with code such as computer program code, software, and/or integrated circuits that are coded to perform such functions, unless indicated otherwise.

Figure 1:
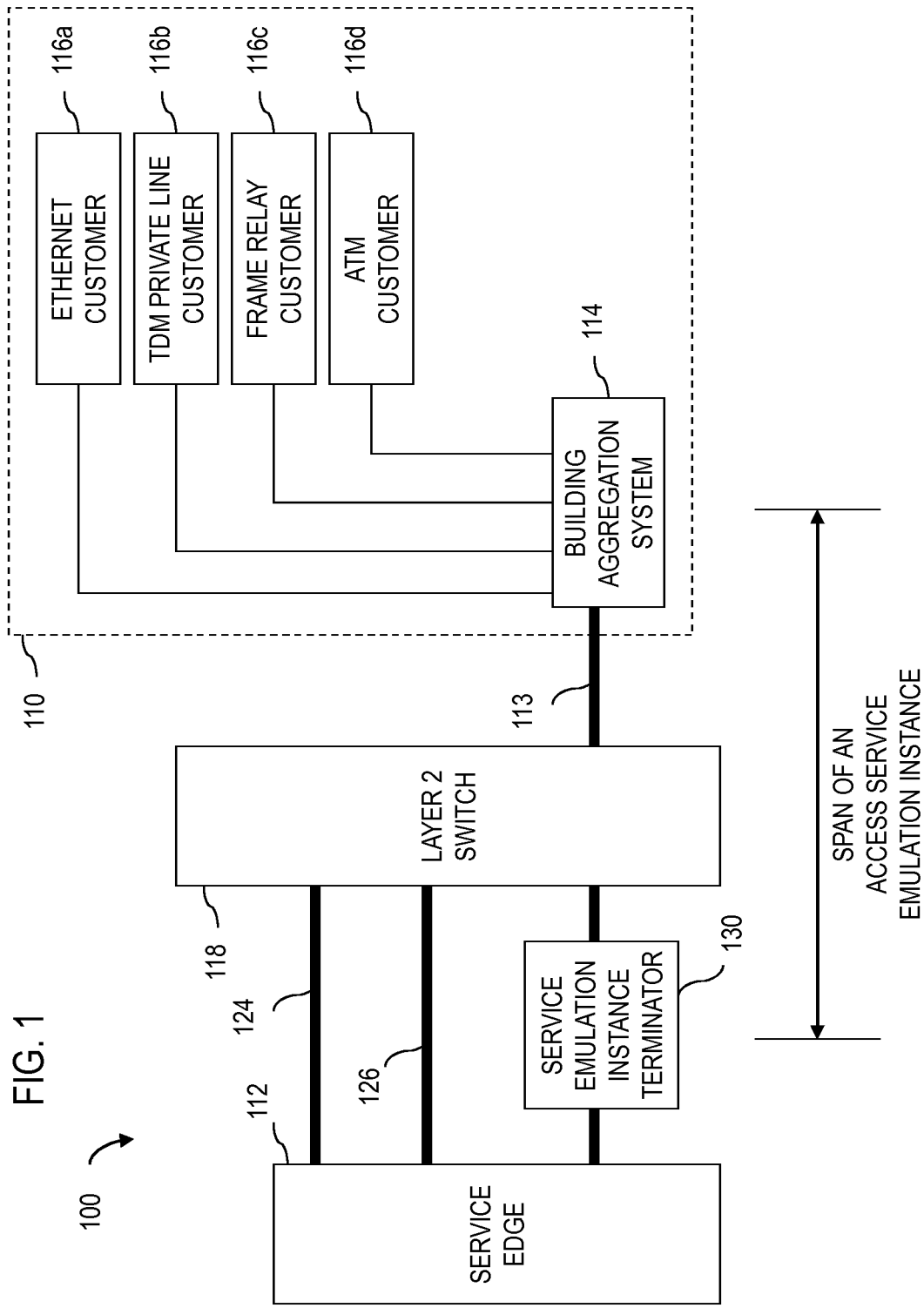
FIG. 1 is a network diagram in accordance with an embodiment of the present invention.

FIG. 1 is a network diagram in accordance with an embodiment of the present invention. FIG. 1 illustrates an access network 100 by which a customer site 110 is coupled to, and accesses the services of, a service edge 112. Generally, the service edge 112 represents the access points to a service provider's network, which may comprise one or more core networks (not shown). A core network may comprise, for example, a system of time-division multiplexing (TDM) switches, such as a network of Class 3 telephone switches. A core network may also comprise an asynchronous transfer mode (ATM) and/or a frame relay network covering much the same geographical territory as the TDM network. Moreover, a network of Internet Protocol (IP) routers may also be supported in the core network. While these networks may overlap or cover much the same geographical territory, each are designed to efficiently carry particular types of traffic or exhibit particular properties that are amenable to certain types of traffic. Although this "multiplanar" network situation may frequently be encountered, it should be understood that the present invention may be equally applicable to a converged core network where native Layer 2 handoff at the service edge is preferred. Service edge 112 is illustrated as a single network element for illustrative purposes only, and may actually include multiple network elements or multiple access interfaces having different capabilities.

By way of example, sources of different types of communications are depicted within customer site 110. One of the sources is Ethernet customer 116*a* coupled to a building aggregation system 114 over any form of connectivity amenable to Ethernet traffic, such as a 100BaseT, Gigabit Ethernet (GbE) or Digital Subscriber Line (DSL) connection. Another source of traffic may be private line customer 116*b*, which is coupled to the building aggregation system 114 via DS1 line. Source 116*c* represents frame relay customers having their frame relay traffic carried over TDM facilities such as DS1 lines to the building aggregation system 114. Asynchronous transfer mode (ATM) customer 116*d* represents ATM customers having their ATM cell traffic carried over TDM facilities such as DS1 lines to the building aggregation system (BEAS) 114. Other types of connections may be used as required to support specific customers' needs. Each of the customer premise equipment (CPE) 116 may comprise one or more devices. For example, the Ethernet customer 116*a* typically includes a router communicatively coupled to other routers, hubs, user workstations, servers, or the like. The CPE 116*a*-116*d* are collectively referred to as CPE 116.

To provide connectivity toward service edge 112, the building aggregation system 114 is coupled to a Layer 2 switch 118 via a communications link 113 such as a DS3 communications link or the like. The Layer 2 switch 118 provides switching and routing of traffic based upon information applied to the traffic, the information corresponding roughly to Layer 2 or the "data link layer" of the OSI Reference Model, and without having to examine the content of the customer data in the traffic.

An example of a building aggregation system 112 suitable for use with the present invention is disclosed in commonly owned U.S. patent application Ser. No. 10/858,503 (See docket number RIC04010), entitled "Method and Apparatus for Processing Labeled Flows in a Communications Access Network," filed Jun. 1, 2004, which is incorporated herein by reference in its entirety.

Communications link 113 communicatively coupling the building aggregation system 114 and the Layer 2 switch 118 may be any suitable communications link, such as an optical fiber, optical ring, a gigabit Ethernet (GbE) connection, or the like. It is also worth noting that the Layer 2 switch 118 may be coupled to a large number of customer sites 110 and building aggregation systems 114 to perform an intermediate aggregation and distribution function within the access network 100. The Layer 2 switch 118 may also be coupled directly to the CPE 116.

In accordance with the present teachings, the building aggregation system 114, or some other network element, can be equipped to serve as one end of a plurality of carrier-tagged flows. A carrier-tagged flow represents a logical communications channel or flow established to carry carrier-tagged communications between two or more parties, or two or more points served by a communications system. The carrier-tagged communications can be voice, data, audio, video, or any other type of communications. A carrier-tagged flow may be implemented using a service emulation instance, such as a pseudowire as described in an IETF draft document entitled "draft-ietf-pwe3-arch-06.txt" or successive versions thereof. This technology allows a packet-switched network to emulate other types of packet or TDM transport services. For example, a pseudowire may be implemented in an Ethernet network, yet may provide transport of communications that mimics the attributes and performance of common data link protocols, such as ATM, frame relay, as well as Synchronous Optical Network/Synchronous Digital Hierarchy (SONET/SDH) or DSn signals. An Ethernet-based pseudowire may employ variable length packets even when carrying fixed-length cells or frames, such as 53-byte ATM cells. A pseudowire is typically implemented along a tunnel implemented in a packet-switched network. Some types of tunnels that may be suitable for carrying pseudowires, or even other types of communications that may be employed in conjunction with the present teachings, include Label Switched Paths (LSPs) according to the MultiProtocol Label Switching (MPLS) protocol, Layer 2 Tunneling Protocol (L2TP) tunnels, IPsec tunnels, etc.

Each service emulation instance is identified by a service emulation instance mapping identifier. For example, the service emulation instance may be implemented as a pseudowire that is identified by a service emulation instance mapping identifier such as a pseudowire label or the like. Service emulation instance mapping identifiers may be locally significant on any port and can be swapped on a hop-by-hop basis as needed to provide a large number of flows using the finite number of identifier values that are available (e.g., approximately 1 million in the case of pseudowire labels). In this manner, switching in the access network can be simplified by encapsulating traffic in service emulation instances and by interpreting and manipulating the corresponding service emulation instance identifiers. The access network may transparently support a mixture of flow types and customer content, including any customer-specific addressing or virtual networking fields embedded in the customer content. The pseudowire architecture as described in documents promulgated by the Internet Engineering Task Force (IETF), such as RFCs 3916 and 1985, which are incorporated herein by reference, provides one example of a service emulation approach involving encapsulation and labeling of traffic. It should be noted, however, that other protocols may be used, and embodiments of the present invention may be implemented with other types of protocols and physical connections.

The building aggregation system 114 couples traffic of various types, such as traffic from the CPE 116*a*-116*d*, onto the appropriate corresponding service emulation instances that have been established to emulate the type of transport suitable for each type of traffic. It should be noted that while in one embodiment the building aggregation system 114 serves as one end of the service emulation instances, other embodiments may be implemented in which the CPE 116, the Layer 2 switch 118, or some other intermediate device acts as one end of the service emulation instances.

A service emulation instance terminator 130 may serve as the other end of service emulation instances. Where service emulation instances are used as carrier-tagged flows, a service emulation instance terminator 130 may serve as the other end of a number of service emulation instances which have originated at one or more building aggregation systems 114 and passed through Layer 2 switches 118. The service emulation instance terminator 130 switches or routes traffic from service emulation instances to a corresponding port and/or flow communicatively coupled to the service edge 112. In this manner, the building aggregation system 114, Layer 2 switch 118, service emulation instance terminator 130, and communications links therebetween may coordinate to simultaneously function as any of the various data-link layer transport types that may be required by customers, including ATM, frame relay, TDM, Ethernet/IP, Point to Point Protocol/High-level Data Link Control (PPP/HDLC), and the like.

It should be noted that the service emulation instance terminator 130 is shown as a single and separate component within the access network for illustrative purposes only. The service emulation instance terminator 130 may be a plurality of components or may be incorporated into one or more other components, such as the Layer 2 switch 118, the service edge 112, or the like. Consequently, a service edge 112 may effectively incorporate the functions of a service emulation instance terminator 130 or may otherwise be capable of directly accepting and processing carrier-tagged flows. In this case, a service edge 112, or some portion thereof, may be coupled more or less directly to Layer 2 switch 118 and the communications to and from the service edge may bear flow-identifying carrier tags in the form of pseudowire labels, tunnel labels, VLAN tags or the like. Service emulation instance terminator 130 may nevertheless be useful in situations where an existing or legacy portion of a service edge lacks the ability to handle carrier-tagged access communications. As mentioned earlier, service edge 112 may actually represent several separate access points, perhaps to different types of core networks. Some access points within service edge 112 may be amenable to carrier-tagged flows whereas others may not be. Links 124 and 126 may represent links to TDM—capable ports on the service edge from TDM ports on Layer 2 switch 118. It is also possible that, for example, one or both of these links may represent packetized data links and may even represent a service edge that is able to accept carrier-tagged flows, such as carrier-tagged pseudowires, directly without requiring service emulation instance terminator 130.

It should also be noted that the service emulation instance terminator 130 can be implemented using a computer having a system unit and a machine-readable medium to direct the operation of the computer. The computer may also have a video display terminal, an alphanumeric input device (e.g., a keyboard) having alphanumeric and other keys, and a mouse or other pointing device. Examples of a computer that may be used in accordance with the present invention include rack-mounted processing boards, personal computers, workstations, mini-computers, or the like.

In an exemplary embodiment, Ethernet is utilized as the link-based Layer 2 protocol over which service emulation communications are transmitted. The application of Ethernet in the access network can be based on TDM encapsulation, using X.86 or GFP, e.g. Ethernet over SONET (EoS). Other protocols may be used (e.g., frame relay) as a basis upon which other services may be emulated. In an exemplary embodiment, variable length Ethernet frames are used to emulate Layer 1 and Layer 2 services.

In operation, the building aggregation system 114 receives Ethernet traffic from Ethernet customer 116a via the building "riser." The building aggregation system 114 receives this traffic along a port that is known to correspond to Ethernet customer 116a and, having coordinated with at least service emulation instance terminator 130, maintains an association between the customer's port and Ethernet traffic stream and a corresponding service emulation instance. Likewise, at the other end of the service emulation instance, the service emulation instance terminator 130 delivers the customer's traffic to the service edge 112 and coordinates with the service edge 112, such as by mapping of port numbers or directing of flows, to ensure that the network identifies the customer's traffic as such and appropriately handles the traffic.

To establish or modify the customer's service emulation instance established between the CPE 116 and the service edge 112, the customer may indicate to the network service provider the desire to establish communications in a particular manner. This request may be submitted either manually or automatically through a user network interface (UNI). As will be described in greater detail below, the establishment of communications through the access network shown may originate in a variety of ways. To coordinate fulfillment of an access communications request, a network management system, provisioning function, or the like, may dispatch provisioning and configuration instructions to the building aggregation system 114, the Layer 2 switch 118, the service emulation instance terminator 130, or other network elements.

Figure 2:
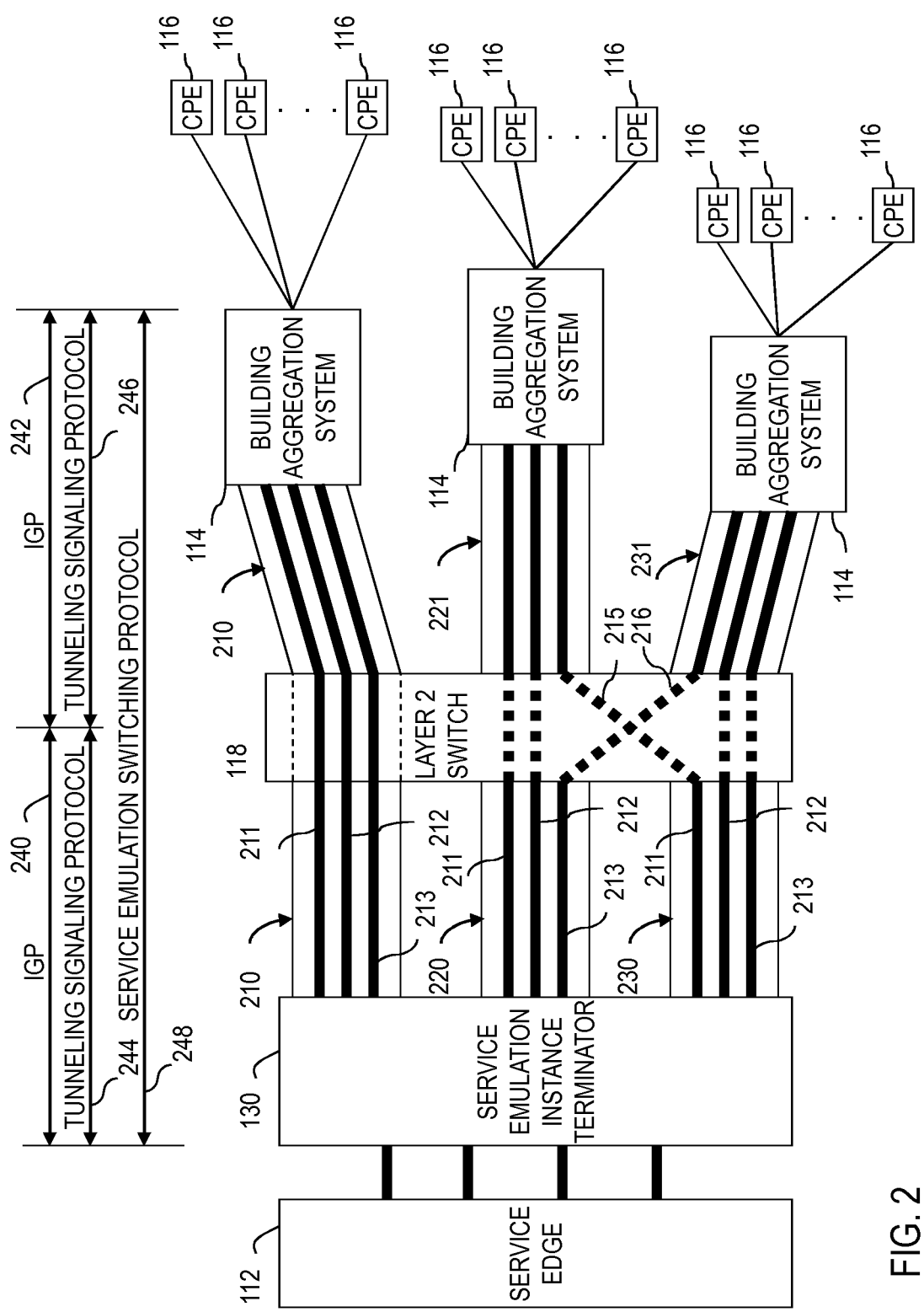
FIG. 2 is logical view of service emulation instances in accordance with an embodiment of the present invention.

FIG. 2 is a logical view of service emulation instances in accordance with an embodiment of the present invention. As described before, one purpose of an access network is to efficiently and flexibly couple customer sites (represented by building aggregation systems 114 communicatively coupled to the CPE 116) to the edge of a service provider's network represented by the service edge 112. The Layer 2 switch 118 is shown as an intermediary and may participate in grooming, aggregating and directing communications traffic in the access network, as well as performing crossover switching between TDM ports and packet-oriented ports. It is noted that FIG. 2 illustrates two-hop paths, although it is possible that there are some intervening transmission elements or another Layer 2 switch 118 along the access coupling.

In FIG. 2, multi-protocol label switching (MPLS) label switched paths (LSPs) 210, 220, 221, 230, and 231 are shown to have been established between various building aggregation systems 114 and the service edge 112 for illustrative purposes. Each LSP corresponds to a pathway or a means of forwarding traffic from the building aggregation system 114 to the service edge 112 and may comprise one or more service emulation instances, e.g., service emulation instances 211, 212, and 213, that may carry traffic based upon service emulation instance mapping identifiers prepended to the traffic and a mutual understanding among the network elements as to how to handle traffic having a specific tag value.

Each LSP may accommodate one or more service emulation instances, and each service emulation instance can be of a specific type. By virtue of VLAN "stacking" and having different Layer 2 addresses present in the traffic that may be encapsulated, each service emulation instance 211, 212, 213 may carry multiple customer-specified flows. This behavior can be controlled by the customer and can be transparent to the access network 100. In accordance with the present teachings, the access network may be unconcerned with anything but the outermost labels or carrier tags applied for access network purposes, such as tunnel labels or service emulation instance mapping identifiers.

It should be noted that label switched path 210 represents one embodiment of the present invention in which the label switched path is routed via a tunnel label. In other words, each unit of traffic (e.g., frame, packet, etc.) is tagged with a tunnel label and elements use the tunnel label to determine how to process and where to send the traffic. In this situation, each service emulation instance within the tunnel identified by the tunnel label, e.g., label switched path 210, is routed or switched in the same manner, as illustrated by the dotted label switched path line and the solid service emulation instance lines through the Layer 2 switch 118. In an alternative embodiment, a service emulation instance may be routed or switched based upon a service emulation instance mapping identifier. In this situation, the label switched paths are established between the various building aggregation systems 114 and the Layer 2 switch 118 and between the Layer 2 switch 118 and the service edge 112. Where tunnels are established on a hop-by-hop basis, such as tunnel 231 between building aggregation system 114 and Layer 2 switch 118, tunnel labels may be optional and switching within Layer 2 switch 118 may be based upon a service emulation instance mapping identifier present in the traffic as just described.

For example, reference numerals 220 and 230 indicate label switched paths established between the Layer 2 switch 118 and the service emulation instance terminator 130, and reference numerals 221 and 231 indicate label switched paths established between various building aggregation systems 114 and the Layer 2 switch 118. Each of the service emulation instances within label switched paths 220, 221, 230, and 231 may be routed or switched independently of each other, as indicated by the dotted service emulation instance lines 215 and 216 through the Layer 2 switch. The tunnel label and service emulation instance mapping identifier are discussed in greater detail below with reference to FIG. 3.

As depicted by reference numeral 248, a label selection or service emulation switching protocol, such as the Label Distribution Protocol (LDP), may be exercised among the service emulation instance/LSP end points, namely the building aggregation system 114 and the service emulation instance terminator 130. Reference numerals 240 and 242 represent the choice of routing between the building aggregation system 114 and the Layer 2 switch 118 and between the Layer 2 switch 118 and the service emulation instance terminator 130. Identifying and selecting the appropriate paths through the access network may be accomplished using an interior gateway protocol (IGP) such as the Open Shortest Path First-Traffic Engineered (OSPF-TE) approach as described in Internet Engineering Task Force's (IETF's) Request For Comments (RFCs) 2328, 2676, et al., which are incorporated herein by reference. Other routing protocols are known and may be used.

Reference numerals 244 and 246 indicate that a tunneling signaling protocol, such as the Resource Reservation Protocol (RSVP), may also be used in conjunction with other techniques during establishment of the label switched paths so that the elements involved along the path commit to allocating a specific quantity of bandwidth and other resources to support the requested flow. Alternatively, it is possible to establish static LSPs wherein no signaling is required.

Multiprotocol label switching (MPLS) is described in documents IETF's RFCs 3031, 2702, et al. maintained by the Internet Engineering Task Force (IETF), which are incorporated herein by reference. Related to the negotiation of labels that are used in MPLS, the label distribution protocol (LDP) is described in IETF's RFC 3036, which is also incorporated herein by reference. The label distribution protocol is also discussed in an IETF Draft entitled "draft-ietf-pwe3-control-protocol-06.txt" or successive versions thereof. The use of RSVP, MPLS and LDP are shown by way of example only and should not be construed as limiting the ways in which the present invention may be implemented.

FIG. 2 is provided as a logical view and various physical implementations may be used. For example, each of the label switched paths 210, 220, and 230 may be transported over one or more communications links. It should also be noted that the flows 211, 212, and 213 are illustrated as remaining together within each of the labeled switched paths 210, 220, and 230 for illustrative purposes only. Upon reaching a switching point, such as Layer 2 switch 118, at the terminus of a tunnel, such as label switched path 221, each flow through the access network may be switched independently based upon, among other things, the type of service being provided, the requested service edge, one or more aspects of the traffic, and the like. This switching possibility is depicted by dashed lines 215 and 216 in FIG. 2.

Once the service emulation instance is established, the building aggregation system 114 maintains an association between the service emulation instance mapping identifier and the port and/or virtual circuit through which the customer's traffic is received. Thus, as traffic is received along this port, it is coupled to the correct service emulation instance that has been established. For example, the traffic from CPE 116a-116d enter through respective ports of the building aggregation system 114 and are coupled onto suitably configured service emulation instances.

In practice, the frame relay traffic from the CPE 116c, although passing through DS1 lines in the building riser, may be extracted as frame relay frames by the building aggregation system 114 and coupled into FR-type service emulation instances. This is more efficient than passing the FR-laden DS1 communications, as such, through a service emulation instance. The DS1 circuit would unnecessarily reserve a constant bandwidth at all times whereas carrying the frame relay traffic allows for multiplex gains, including statistical multiplexing.

The service emulation instance terminator 130 may terminate a large number of service emulation instances that have originated from one or more building aggregation systems 114. The service emulation instance terminator 130 may be viewed as "front ending" the service edge 112. At the service emulation instance terminator 130, the various service emulation instances are terminated and the traffic carried through each service emulation instance is recovered and passed to the service edge 112 appropriate for the type of traffic.

Typically, frame relay traffic arriving through a service emulation instance is to be passed along to a frame relay core network, if there is one. Likewise, TDM traffic should be passed along to a TDM network, and Ethernet or IP traffic should be passed along to a packet-switched service network in the core. It may be desirable in some situations to carry a first type of transport over a second type of transport for example, carrying IP traffic over a SONET TDM core network to efficiently utilize existing networks. Consequently, the service emulation instance terminator 130 may also provide interworking or adaptation so that frame relay traffic that arrives through a service emulation instance may be passed along to an Ethernet-based service edge element for transport over something other than an end-to-end frame relay network.

For convenience, the operation of various embodiments of the present invention discussed herein are described in terms of traffic flowing from the CPE 116 to the service edge 112. However, it should be noted that the same techniques discussed herein also handle traffic leaving the service edge and being distributed to an appropriate customer end point. Every element may serve a complementary role related to the direction of flow. The service emulation instance terminator 130 receives aggregated flows from the service edge 112 and sends the traffic to a Layer 2 switch 118 over a communications link, but it also receives traffic from a Layer 2 switch 118 over the communications link and distributes the traffic to the appropriate service edge 112. The Layer 2 switch 118 and the building aggregation system 114 may also operate bi-directionally. The service emulation instance terminator 130 may also perform aggregation services to aggregate flows from a plurality of service edges to one or more flows to be transmitted to the building aggregation system 114.

The possible bi-directionality of some traffic may have implications for the establishment of pseudowires if MPLS tunnels or the like are utilized. For example, where an RSVP/LDP mechanism is used to establish label switched paths, a bi-directional link may require initiating the formation of a path in one direction, originating at the building aggregation system 114, and forming the corresponding path in the reverse direction by originating an RSVP request from the service emulation instance terminator 130. These paths will be independently formed, may have different QoS requirements, and may take different routes between the building aggregation system 114 and the service emulation instance terminator 130.

FIG. 3 illustrates examples of data messages or frames that may be transmitted into the access network, or received from the access network, by the service emulation instance terminator 130 in accordance with an embodiment of the present invention. Each of messages 310-318 have two portions: a carrier-tagged flow payload 322 and one or more prepended carrier tags 320. The carrier-tagged flow payload 322 represents, for example, the information as it is received from customer premise equipment at the customer site. The different types of messages shown correspond to various formats associated with a particular type of CPE interface, such as, for example, an Ethernet frame message 310, a TDM frame message 312, a frame relay frame message 314, an ATM cell message 316, or the like. Other messages, such as a high-level data link control (HDLC) frame 318, an ATM Application Adaptation Layer 5 (AAL5) protocol data unit (PDU), or the like, may also be used. In general, the messages will carry various types of customer data corresponding to Layers 2-7 of the OSI Reference Model.

As FIG. 3 shows, each message type may be tagged and processed in a uniform manner by the addition of one or more carrier tags. FIG. 3 reflects the format of composite messages that are sent between a building aggregation system 114, a service edge 112 and any other intervening elements. As illustrated in FIG. 3, the carrier-tagged flow payload 322 is kept substantially intact and a carrier tag 320 is prepended to the carrier-tagged flow payload 322 to prepare it for transmission through the access network. Depending on implementation, the carrier tag 320 may comprise, for example, a pseudowire label, a VLAN identifier, a tunnel label or the like. Multiple carrier tags may be stacked within a message or frame to provide for a hierarchical aggregation and routing mechanism to be implemented in the access network.

It is particularly noteworthy in FIG. 3 that, regardless of message type, all of the carrier tags 320 may be of uniform format. (In the case of tunnel labels, for example, messages of different types may even have the same tag value if they happen to be routed commonly.) The use of a uniform carrier tag format for all message types makes it possible for simple, generic handling of all traffic types through the access network using a uniform set of network elements that process traffic based on carrier tags. The switching elements within the access network may simply inspect the carrier tag(s) 320 of messages to determine how the message should be switched or routed without regard to message type or contents. In this manner, the access network becomes "service agnostic" and does not have to be concerned with the specifics of the protocols or addressing imbedded in the customer traffic. The generic nature of the carrier tag also allows for readily supporting any other message types not shown in FIG. 3, with little or no changes being required in the design and operation of the Layer 2 switches 118 or other elements.

In some implementations, it may be desirable to prepend one or more tunnel labels (not shown) to the messages 310-318. A tunnel label allows a tunnel to be established throughout the access network, such as between a building aggregator and a service edge, improving scalability in the network. This mechanism may be particularly useful when many service emulation instances are to be routed to the same destination or service edge. By assigning the service emulation instances to a common tunnel, network elements, such as the Layer 2 switch 118, may collectively route the service emulation instances within the tunnel by evaluating the tunnel label. In an exemplary embodiment, the tunnel label is an LSP label prepended to the messages 310-318. In accordance with the present teachings, tunnel labels may also be stacked to any degree needed to support a tunneling hierarchy, which may further facilitate efficient and scalable management of large numbers of flows.

Although the carrier-tagged flow payload 322 is shown and described as being kept essentially intact, it may be desirable in some situations to modify this original message. For example, the original message portion 322 of the Ethernet frame message 310 and the frame relay frame 314 frequently includes a frame check sequence (FCS). In many networks, the FCS is not used and may be removed. In other cases, the Ethernet frame check sequence (FCS) as received in the Ethernet frame may optionally be included, as is, rather than being deleted or recalculated by the building aggregation system 114. This can be advantageous for detecting errors or corruption of the data that might occur as the customer payload traverses the network.

Figure 4A:
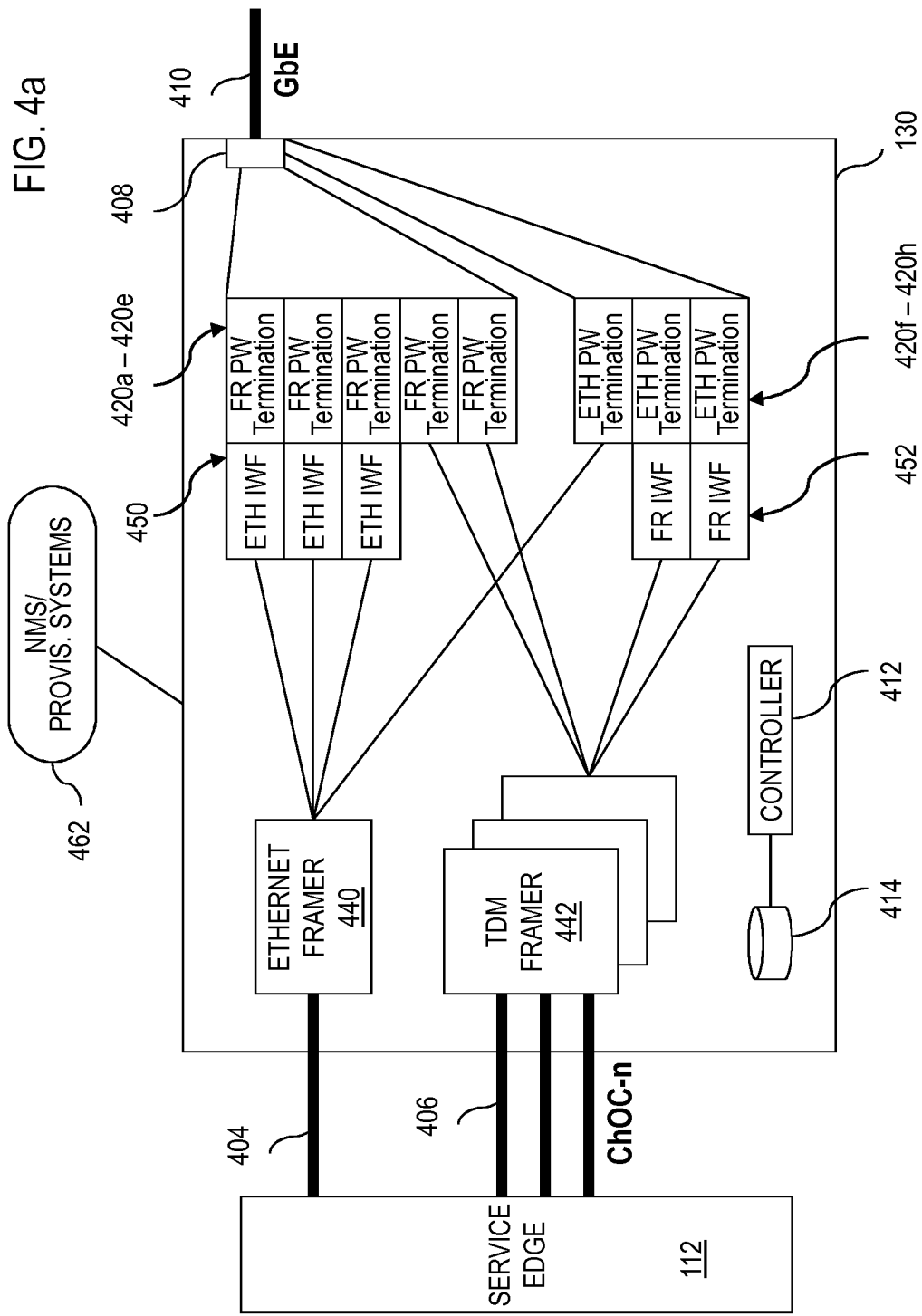
FIGS. 4a and 4b are block diagrams of exemplary service emulation instance terminators in accordance with an embodiment of the present invention.

FIG. 4a is a block diagram including an exemplary embodiment of a service emulation instance terminator that may be used in accordance with an embodiment of the present invention. The service emulation instance terminator 130 comprises a service emulation interface 408 to communicatively couple to a network element in the access network via communications link 410, which may be one or more communications link(s), such as a GbE or 10 GbE communications link from a Layer 2 switch 118. Generally, the service emulation instance terminator 130 receives or transmits aggregated traffic via the communications link 410.

The service emulation instance terminator 130 is communicatively coupled to the service edge 112 (which may comprise a plurality of network elements) via one or more communications links. In the example illustrated in FIG. 4a, the service emulation instance terminator 130 is communicatively coupled to the service edge 112 via one or more GbE or 10 GbE communications link 404 and TDM communications links 406, such as a channelized OC-n communications link. The illustrated communications links are provided for illustrative purposes only and, accordingly, may vary for any particular embodiment of the present invention.

Each service emulation instance terminator 130 may have one or service emulation end point components that could be used to terminate service emulation communications, e.g., traffic received from or transmitted on a service emulation instance over the communications link 410. An example of a service emulation end point is a pseudowire end point. For example, FIG. 4a illustrates an exemplary embodiment in which pseudowires are utilized to emulate frame relay services and Ethernet services. Accordingly, pseudowire end points 420a-420e represent service emulation end point components for pseudowires emulating frame relay services, and pseudowire end points 420f-420h represent service emulation end points for pseudowires emulating Ethernet services. Other types of service emulation end point components may be used to terminate other types of services, such as ATM services and the like.

One or more framers, such as Ethernet framer 440 and TDM framer 442, act as an interface to the communications links communicatively coupled to the service edge 112, e.g., communications links 404 and 406, respectively. The TDM framer 442 may receive traffic from a service emulation end point component (e.g., pseudowire end points 420) or an interworking function 450 to format and transmit TDM traffic, such as frame relay traffic, on a TDM channel which is then passed to the service edge 112. Similarly, the Ethernet framer 440 receives traffic from a service emulation end point component or an interworking function 450 and also formats and transmits Ethernet traffic on an Ethernet communications link. For example, frame relay traffic may have come through a pseudowire and appear in its re-created form at the end of service emulation end point component 420*d*. This frame relay traffic may then be passed to the TDM framer 442 which puts the frame relay traffic onto a TDM channel which is then passed to the service edge over a channelized OC-n interface 406.

The interworking function converts traffic among various types of traffic and may be dynamically configured to convert among types of traffic. For example, the Ethernet interworking function 450 may be configured to accept frame relay traffic along pseudowire end point 420*a*, to repackage the information, and as necessary, to convert any overhead information, port status information, error correction/data integrity check information, and flow control protocols to render a valid Ethernet representation corresponding to the frame relay information. The Ethernet framer 440 may add Ethernet framing data and transmit the traffic to the service edge 112. Another example is shown as frame relay interworking function 452 acts upon Ethernet traffic arriving along pseudowire end point 420*h* and renders a frame relay representation suitable for transport via a TDM framer 442.

The service emulation instance terminator 130 may further comprise a controller 412 and a database 414. The database 414 provides storage for mapping service emulation instance mapping identifiers to particular flows, and may contain instructions regarding whether or not an interworking function and a framer are to be applied. The controller 412 may be any general purpose or special purpose processor, such as an Application Specific Integrated Circuit (ASICs), Network Processors, Complex Instruction Set Computer (CISC), Reduced Instruction Set Computer (RISC), or the like.

In operation, the service emulation instance terminator 130 removes the service emulation instance mapping identifier that had been applied at the originating end of the service emulation instance. Similarly, traffic transmitted by the service emulation instance terminator 130 through the access network via a service emulation instance on the communications link 410 is encapsulated, which may include removing unneeded framing information, prepending the service emulation instance mapping identifier associated with the flow, and transmitting the traffic via the service emulation instance as packet data. The service emulation end point components of a service emulation instance may involve many other operations, such as defragmentation, as will be described in greater detail below.

In the course of emulating a type of transport service, each service emulation end point component may participate in any or all of the following operations to prepare traffic for carriage over a service emulation instance or to reconstruct traffic that has been received through a service emulation instance. Service emulation end point components may perform fragmentation and reassembly to accommodate maximum transmission unit (MTU) limitations of the underlying packet switch network transport. Service emulation end point components may be involved in concatenating small frames, such as ATM cells, to form larger packets that may be more efficiently transmitted through the underlying packet switched network. Service emulation end point components may also be involved in re-ordering of frames or packets, timing/buffering, detection of duplicated or missing portions of transmission, and carriage of control signals and keep alive signals compatible with a native service being emulated.

A network management and provisioning system 462 can be communicatively coupled to the controller 412 (or other components) of the service emulation instance terminator 130 to provide provisioning and management functionality. In response to commands received from the management and provisioning system 462, service emulation instance terminator 130 may coordinate with other elements to resolve service emulation instance mapping identifiers, e.g., pseudowire labels, and to control the invocation of interworking functions to adapt service emulation instance access to the service edge as flexibly as possible. In this manner, the service provider is allowed considerable latitude to optimize how services are provided by the control of the service emulation instance terminator 130, especially by virtue of the flexibility afforded by the interworking functions. Whether coordinated through an external provisioning interface or by other mechanisms, an interworking function may be configured to adapt between a local customer site which may use a first type of transport and a remote customer site which may use a second type of transport different from the first. This capability to provide communications among diverse sites may be of commercial value to a service provider.

Furthermore, an interworking function may adapt between a first type of transport used by a customer site and a second, different type of transport employed by a service edge or a core network. Applying interworking functions at both the service edge ingress and egress points along an end-to-end path through a core network allows a service provider to freely choose whatever form of core transport is preferred, independently of what transport type is experienced by the customer locations at either end of the path. The interworking function applied to service emulation communications through a service emulation instance terminator 130 may be responsive to the transport type of the service emulation communications being different than the transport type associated with a core network or service edge, or different than a remote site to which communications is established through the service edge.

Figure 4B:
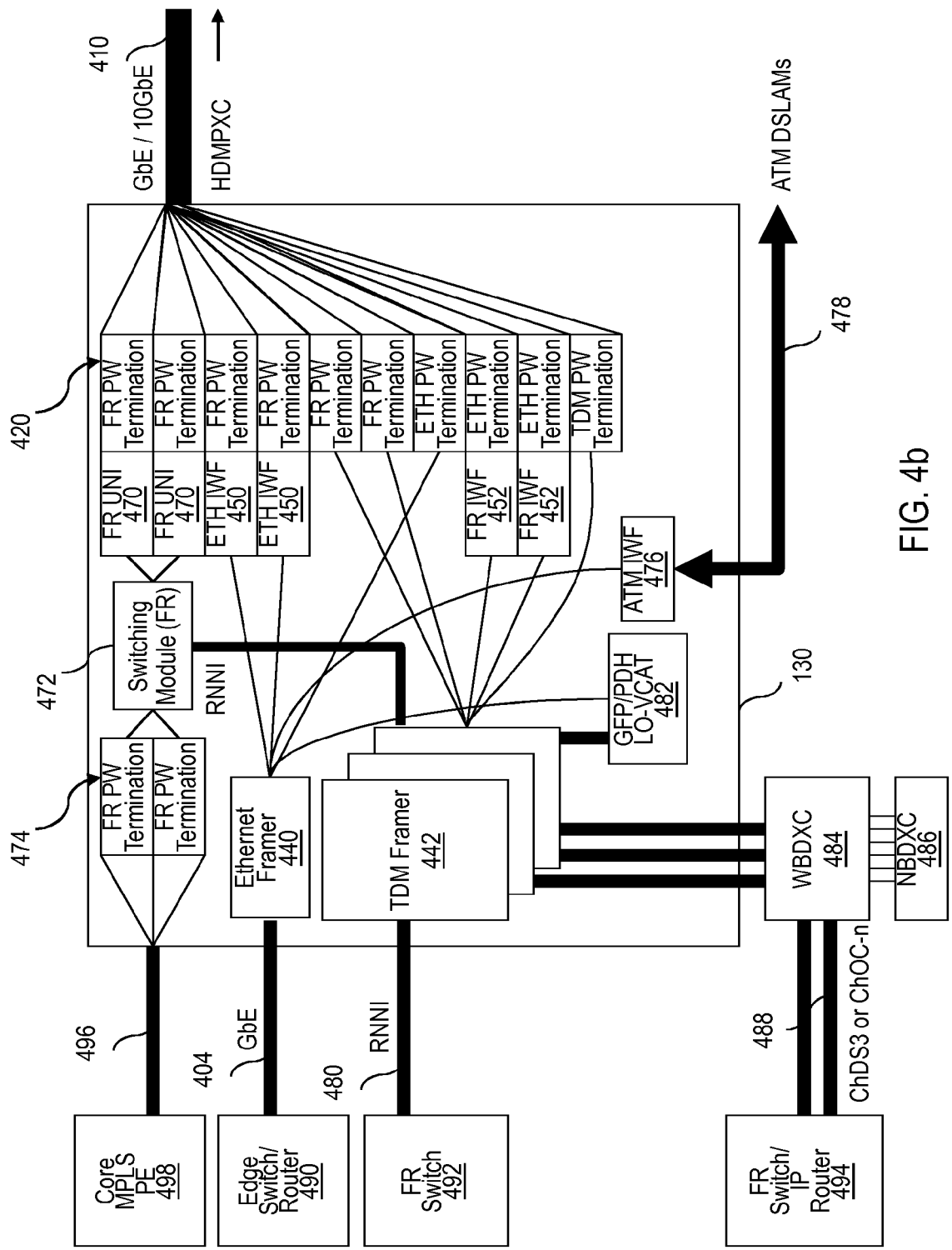

FIG. 4*b* is a block diagram illustrating another exemplary embodiment of a service emulation instance terminator 130 that may be used with an embodiment of the present invention. Further regarding FIG. 4*b*, the use of Multiprotocol Label Switching (MPLS) tunnels carrying pseudowires enables a provider to use a single Layer 2 aggregation and switching mechanism, such as the MPLS label, to aggregate many disparate Layer 2 protocols and L1 time-division multiplexing (TDM) circuits. As many of these protocols may represent legacy services, such as Frame Relay, Asynchronous Transfer Mode (ATM) and TDM private lines, they may be carried on the converged packet access (CPA) network and then ultimately handed to the existing service networks, which may be accomplished by implementation of a pseudowire termination device such as the service emulation instance terminator 130. The device may also be utilized as a platform to provide equivalent services, such as a Virtual Private Wire Service (VPWS), which may be considered comparable to conventional frame relay and ATM virtual circuit (VC) style services.

The service emulation instance terminator 130 as shown in FIG. 4*b* includes an Ethernet interface 410 (Gbe/10 GbE) to a High Density Multi-Protocol Cross-Connect (HDMPXC) or Layer 2 switching functions (L2SW), MPLS/Pseudowire Logical Ports 420, Interworking Functions (IWFs) 450, 452, 476, Frame Relay User-Network Interface functions (UNIs) 470, channelized time-division multiplexing (TDM) framers 442, Ethernet framers 440 and additional MPLS/Pseudowire Logical ports 474. The service edge 112 is further shown as including an edge switch/router 490, a frame relay switch 492, and a frame relay switch/IP router 494 connected to a Wide Band Digital Cross Connect (WBDXC) 484 (connected to Narrow Band Digital Cross Connect (NBDXC) 486) via a Channelized DS3 or Channelized OC-n 488.

A generic framing procedure/plesiochronous digital hierarchy low-order virtual concatenation (GFP/PDH LO-VCAT) 482 may be used for encapsulating Ethernet into TDM payloads. Further, traffic from an ATM access network for Digital Subscriber Line (DSL) 478, via DSL Access Multiplexers (DSLAMs), may be interworked by the ATM interworking function 476 to Ethernet for service in a service network such as an IP network. Alternatively, private lines may be established between an ATM customer and an Ethernet customer or frame relay customer by using interworking functions. Further, point-to-point protocol/high-level data link control (PPP/HDLC) may also be supported in the service emulation instance terminator 130.

For a typical exemplary packet flow from the customer to the network, a Building Ethernet Aggregation System (BEAS) originates a pseudowire within an appropriate packet switched network tunnel (e.g., MPLS label switched path) through the HDMPXC(s) and/or L2SWs and ultimately terminating on the service emulation instance terminator 130. In the exemplary service emulation instance terminator 130 as shown in FIG. 4b, each pseudowire may be treated as a logical port, with the appropriate functions and characteristics attributed to logical ports. These logical ports can then be handled in a variety of ways. Circuit emulated TDM MPLS/PW logical ports 420 may be connected to the TDM framers 442 for passing traffic to a wideband TDM network for grooming. Port Mode frame relay logical ports may also be connected to the TDM framers 442 and passed to the wideband network for grooming. For example, the BEAS could aggregate 4 DS0s from a customer-connected T1 and transport Frame Relay Protocol Data Units (PDUs) via a Port Mode encapsulated PW to the service emulation instance terminator 130 where they are converted back into 4 DS0s for grooming in a wideband/narrowband TDM network.

Frame relay logical ports (LPs) can also be interworked with other IP-carrying Layer 2 protocols such as ATM and Ethernet by using an IP LAN-like Service (IPLS) as is being standardized in the IETF 12vpn working group. These LPs may be implemented as virtual circuit-mode (VC-mode) pseudowires (PWs). A corresponding interworking function may support IP. Further, frame relay logical ports 420 may be connected to a frame relay (FR) virtual user network interface (UNI) function 470 and a switching module 472. With the inclusion of the switching module 472, the service emulation instance terminator 130 can provide switching functionality, permitting connectivity via a Resilient Network-to-Network Interface 480 to the TDM Framer 442 and a Frame Relay switch 492. An exemplary Resilient Network-to-Network Interface suitable for use with the present invention is disclosed in commonly owned U.S. Pat. No. 6,209,039 to Albright et al., entitled "Method and Apparatus for Providing an Interface Between a Plurality of Frame Relay Networks," issued Mar. 27, 2001, which is incorporated herein by reference in its entirety. For an exemplary frame relay service, the switching module 472 can directly utilize FR Pseudowires, via a FR PW Termination 474, a communications link 496, and a Core MPLS PE 498, to interconnect with other metro PW terminating devices in service emulation instance terminators 130 across, e.g., a wide area network, effectively creating a new Frame Relay network without dedicated Frame Relay switches and TDM circuits.

Ethernet PW logical ports 420 may be supported as well. These LPs may be interworked with ATM and Frame as described above. Further, if the Ethernet LPs are interworked to Frame, the resulting Frame Relay PDUs may be sent to the switch function for connection to frame relay networks (not shown). In metro areas where the High Density Multi-Protocol Cross-Connect (HDMPXC) cannot perform PW termination, the Ethernet PWs may be terminated and the resulting Ethernet VLAN-tagged packets aggregated and passed to core service edge devices (e.g., edge/switch router 490) via GbE interfaces such as interface 404.

Grooming devices that support STS-1 level TSI add-drop multiplexing, customer facing Ethernet interfaces (GbE and above) and Layer 2 aggregation/switching functions may be used with this system. The High Density Multi-Protocol Cross-Connect (HDMPXC) may be at the hub location instead of at back-to-back Add/Drop Multiplexers (ADMs). The High Density Multi-Protocol Cross-Connect (HDMPXC) may have an integrated Layer 2 matrix to support packet-switched traffic aggregation and switching. It may terminate multiple Unidirectional Path Switched Ring (UPSR) and Bidirectional Line Switch Rings (BLSR) that are carrying TDM, Ethernet over SONET (EoS) and EoDS3 traffic and interoperate at both an interface and management level with other vendors' ADMs.

Although FIG. 4b is discussed with respect to switching module 472 as employing frame relay switching functionality, it is contemplated that other switching technologies can be employed, such as ATM switching or any other type of switching.

Figure 5:
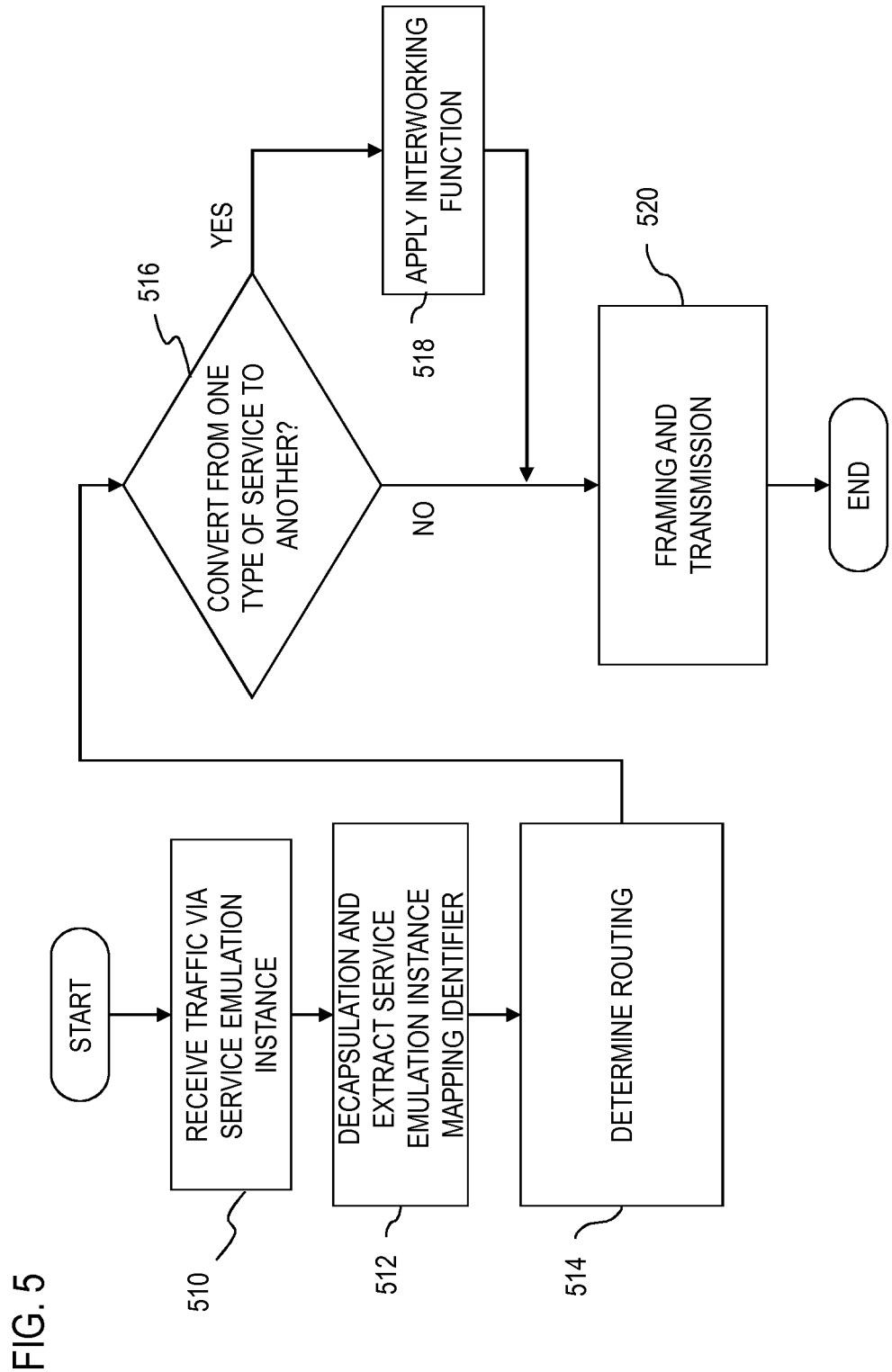
FIG. 5 is a data flow diagram of exemplary steps that may be performed by an exemplary service emulation instance terminator to receive traffic via a service emulation instance from an access network and to transmit the traffic to a service edge in accordance with an embodiment of the present invention.

FIG. 5 is a data flow diagram in accordance with an embodiment of the present invention. In particular, FIG. 5 depicts steps that may be performed by the service emulation instance terminator 130 to receive traffic via a service emulation instance from the access network and transmit the traffic to the service edge 112. The process begins in step 510, wherein traffic is received via a service emulation instance. In one embodiment, traffic is received via a GbE or a 10 GbE communications link communicatively coupled to a Layer 2 switch 118. The communications link may comprise a plurality of service emulation instances, each being identified by a locally unique service emulation instance mapping identifier that has been provisioned along the access path. In step 512, the service emulation communications is decapsulated to extract the native message and the service emulation instance mapping identifier. Here, the native message refers to the data traffic that has been submitted by a customer site to the access network for transmission to a service edge. The native message may also be referred to as the service emulation instance payload. Multiple service emulation instances mapping identifiers or other carrier tags may be received on the traffic due to the use of hierarchical encapsulation or nesting of tunnels or of service emulation instances within other tunnels or service emulation instances. In accordance with the present teachings, this stacking may occur to any degree. Consequently, the decapsulation in step 512 may involve removing multiple service emulation instance mapping identifiers or carrier tags from the service emulation communications in order to extract the native message in a form ready to be provided to service edge 112.

Next, in step 514, the service emulation instance terminator 130 uses the service emulation instance mapping identifier to determine the routing instructions. As discussed above, a service emulation instance mapping identifier is associated with a service edge and logical port. Accordingly, the service emulation instance mapping identifier is used to determine to which service edge and logical port the traffic associated with the service emulation instance mapping identifier is to be routed. In the event that multiple service emulation mapping identifiers or other carrier tags are present, the routing of traffic may take into account some or all of the tags. Some tags may correspond to a tunneling through the access network that is of no consequence to a service edge, whereas other tags may be essential to uniquely identifying a given flow. In the course of provisioning, for example, controller 412 and database 414, described earlier, may participate in managing the termination of nested tunnels or of service emulation instances and in manipulating and interpreting stacked carrier tags, such as stacked service emulation instance mapping identifiers. One mechanism in which the routing instructions may be determined is by the use of a look-up table indexed by the service emulation instance mapping identifier. Another mechanism that can be used is to encode in the service emulation instance mapping identifier information regarding the use of an interworking function, the port or service edge to which the traffic in the service emulation instance is to be routed or switched, content information, or the like. This may be implemented by assigning specific meanings to specific bits of the service emulation instance mapping identifier. Other mechanisms, such as dynamically requesting routing instructions from a routing system, may also be used.

The routing instructions further indicate whether or not an interworking function is to be invoked to convert between types of traffic. The interworking function may be desired, for example, in situations in which frame relay traffic is received, but is to be routed to an Ethernet interface in the service edge 112. The interworking function may also be desired in situations in which Ethernet traffic is received, but is to be routed to a TDM interface in the service edge 112. Interworking functions may be desired in other situations.

Accordingly, in step 516, a determination is made whether or not the traffic received via the service emulation instance should be converted from one type of service (or format) to another type of service (or format). If the determination is made that conversion is needed or desired, then processing proceeds to step 518, wherein the traffic from the service emulation instance is applied to the appropriate interworking function and the conversion is performed.

After step 516 or step 518, processing proceeds to step 520, wherein a framing and transmitting procedure is performed. To transmit the data, the data is put into the appropriate format or frames and transmitted in accordance with the corresponding signaling protocols. For example, if the traffic is to be transmitted via a TDM format, it is necessary to format the traffic as a TDM frame and to transmit the TDM frame with the appropriate signaling and framing protocols. Thereafter, the process terminates.

Figure 6:
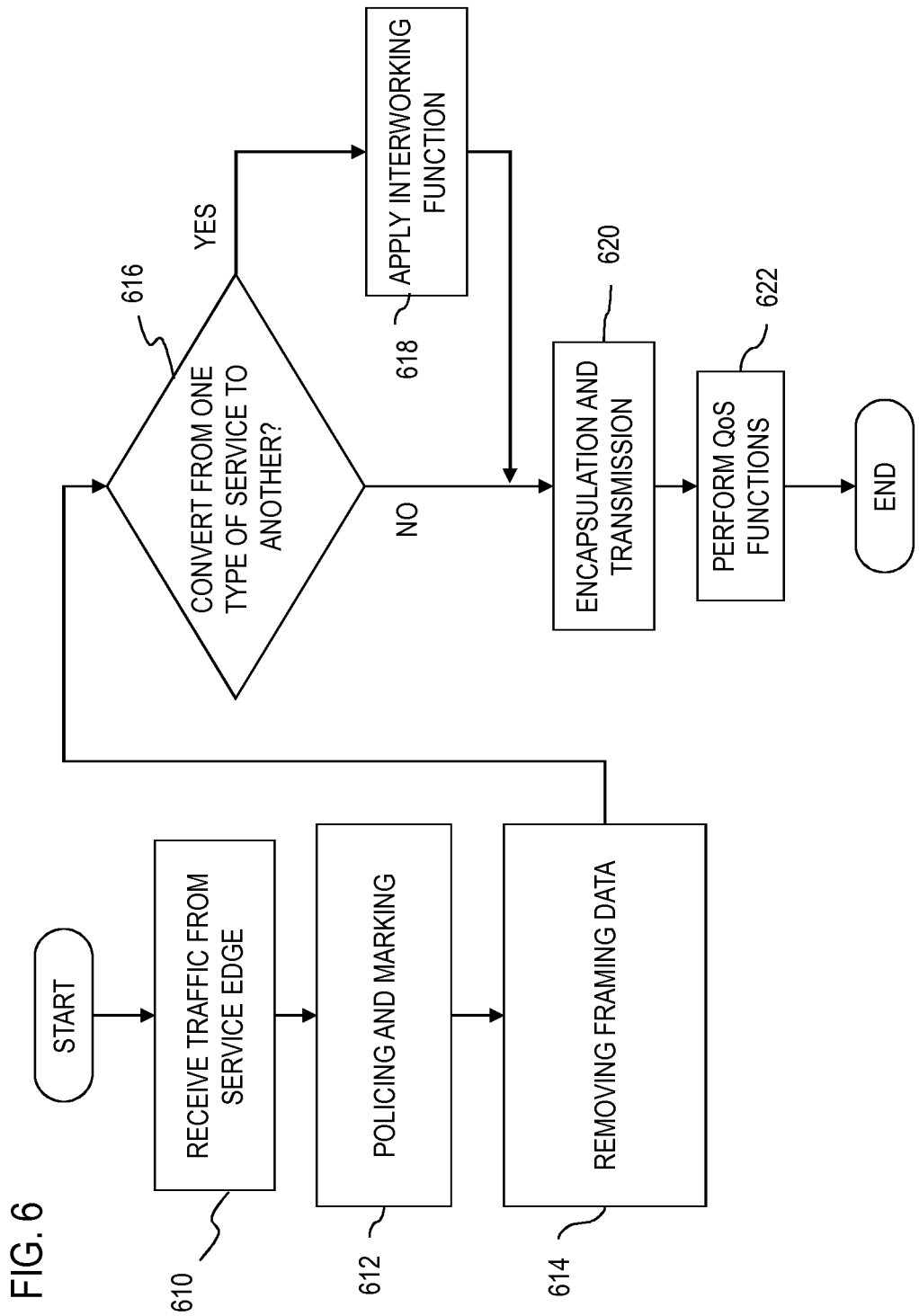
FIG. 6 is a data flow diagram of exemplary steps that may be performed by an exemplary service emulation instance terminator to receive traffic from a service edge and to transmit the traffic via a service emulation instance to an access network in accordance with an embodiment of the present invention.

In particular, FIG. 6 depicts steps that may be performed by the service emulation instance terminator 130 to receive traffic from the service edge 112 and transmit the traffic via a service emulation instance to the access network. The process begins in step 610, wherein traffic is received from the service edge 112. As discussed above, the service emulation instance terminator 130 may have a framer to interface with the various types of services or formats of the service edge 114, such as the TDM framer 442 (FIG. 4*a*) and the Ethernet framer 440 (FIG. 4*a*). Upon receipt of traffic from the service edge 112, the framers remove the framing information in preparation for transmitting the information along the access path via a service emulation instance, as illustrated in step 612. It should be noted that portions of the traffic corresponding to OSI Reference Model Layers 2-7 may be left substantially unmodified. In this manner, the traffic may easily be recreated in its native form on the other end of the service emulation instance, such as the building aggregation system 114 (FIG. 1).

In step 614, a policing and marking function may be performed. Generally, policing (sometimes referred to as a rate-limiter or meter in Diffserv terminology) determines non-conforming packets of a classified flow based upon a specified traffic profile, for example, average rate and maximum burst duration and may drop non-conforming packets. Marking sets the value of the Ethernet priority or TOS/DSCP byte or MPLS EXPerimental (EXP) Bits, using information from the classifier and/or policer. In particular, MPLS LSPs have three experimental bits that are commonly used to signal relative priority or DiffServ Per Hop Forwarding Behavior (PHB). These bits, however, are not generally used for pseudowires or virtual circuits. In an embodiment, the EXP bits are used to signal relative priority or PHB, allowing a network to provide QoS on aggregate LSPs and to provide granular QoS on a per-pseudowire or per-flow basis.

In step 616, a determination is made whether or not the traffic is to be converted or translated from one type of service or transport to another type of service or transport, and if so, processing proceeds to step 618, wherein the traffic is converted or translated from one type of service or transport to another. For example, TDM traffic may be converted to packet data suitable for transport over an Ethernet link, or Ethernet traffic may be converted to TDM data suitable for transport over a TDM link. Other types of translations or conversions may be performed.

After steps 616 or 618, processing proceeds to step 620, wherein the traffic is encapsulated and transmitted via a service emulation instance. As discussed above, each service edge and logical port is associated with a service emulation instance mapping identifier (via the provisioning process). The encapsulation process involves determining the service emulation instance mapping identifier and encapsulating the traffic with the service emulation instance mapping identifier and transmission framing information. Where an access network may employ nesting of tunnels or of service emulation instances along communications link 410, the encapsulation of step 620 may involve appending multiple service emulation instance mapping identifiers or other carrier tags to the traffic. The encapsulated packets are then transmitted to the access network, which routes the traffic in accordance with routing instructions associated with the service emulation instance mapping identifier or tunnel (e.g., LSP label).

Next, in step 622, QoS functions, such as policing, rate shaping, classifying, marking, queuing, and scheduling, and the like may be performed to provide a specific quality of service (QoS). Generally, classifying selects packets based on fields in the packet headers. The classification may be based upon interface, incoming carrier tag, Ethernet priority, MPLS EXP bits, and/or Type of Service (TOS)/Diffserv Code Point (DSCP) in the IP header. Matching criteria may be, for example, exact, prefix-only, within a range, masked and/or the use of wildcard.

Shaping delays packets within a classified flow to cause them to conform to a specified traffic profile. The queuing function (or buffering) provides storage for packets prior to transmission. Queuing also includes a function that determines which packets it admits. Examples of the admit function include a storage capacity or a threshold based upon packet marking. Scheduling selects a packet from a queue and transmits it onto an output link in accordance with a selection discipline, for example, priority queuing, or some form of weighted service across multiple queues.

Figure 7:
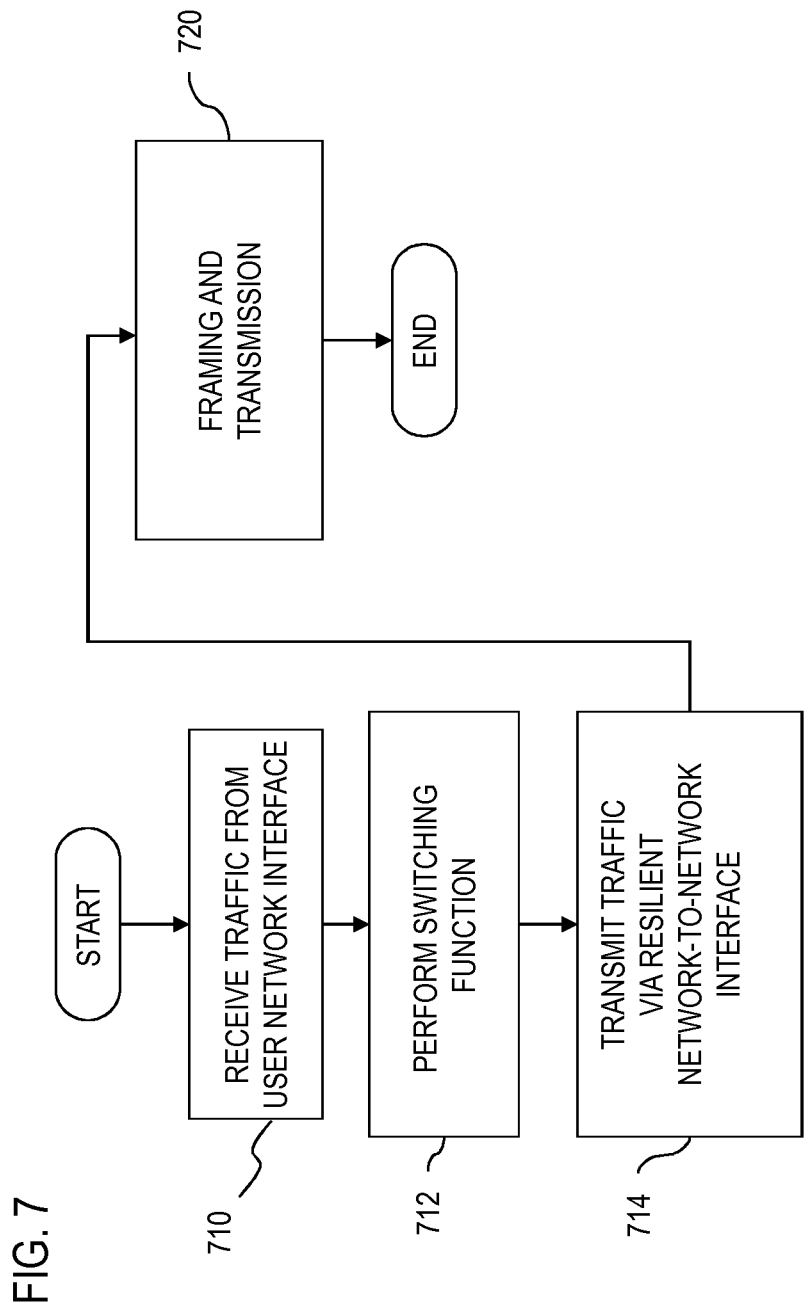
FIG. 7 is a data flow diagram of exemplary steps that may be performed by an exemplary service emulation instance terminator to switch portions of aggregated flows in accordance with an embodiment of the present invention.

FIG. 7 is a data flow diagram in accordance with an embodiment of the present invention. In particular, FIG. 7 depicts steps that may be performed by the service emulation instance terminator 130 to perform a switching function on traffic, or information flow, received via the service emulation instance from the access network and to transmit the traffic, or information flow, to the service edge 112. The process begins in step 710, wherein traffic, or information flow, is received via a user network interface such as the FR UNI 470 of FIG. 4b. The traffic, or information flow, is received, e.g., by the FR PW termination 420 and decapsulated to its native message format for passing to the switching function via the user network interface.

The information flow may originate in remote customer premises equipment (CPE) as Frame Relay information flow, e.g., compatible with Local Management Interface (LMI) signaling or command functions. The information flow from the CPE may include data link connection identifiers (DLCIs), included in Frame Relay frames, identifying Frame Relay virtual circuits, which may be LMI DLCIs (e.g., a DLCI value of 1023). The CPE may maintain some control over the handling of information flow in the service emulation instance terminator 130 by including DLCI values to be recognized by the FR UNI 470 for communication with the switching module 472, indicating a destination of the particular information flow, e.g., whether the particular information flow is to be forwarded to the FR PW Termination 474 for encapsulation and transmission to the Core MPLS PE 498, or via the RNNI 480 to the TDM Framer 442 and the FR Switch 492. Thus, a customer's CPE may request a particular bandwidth on demand via a particular portal. In step 712, the switching function is performed on the native message.

Next, in step 714, the switched traffic is transmitted via a resilient network-to-network interface to a framer. In step 720, the traffic is framed and transmitted according to the framer used (e.g., the TDM framer 442 of FIG. 4). Alternatively, after switching, the switched traffic may be encapsulated (e.g., via the FR PW Termination 474, communication link 496, and Core MPLS PE 498) and transmitted over a core network, for example, to another service emulation instance terminator 130, thus accomplishing the switching functionality, e.g., in the service emulation instance terminator 130. Local Management Interface (LMI) functionality may also be performed. LMI is a standardized maintenance protocol used to permit the exchange of information between routers or other Frame Relay Assemblers/Disassemblers, which may belong to a user, and Frame Relay nodes which form part of a public network. DLCI values of 0 and 1023 are reserved for the LMI, as two different LMI standards have been issued, one by the International Telecommunications Union Telecommunication Standard Sector (ITU-T) and the other by the American National Standards Institute (ANSI). The LMI protocol handles functions such as control and supervision of the user interface, checking the status of the subscriber connection, and informing a user about an addition, disconnection or modification of a permanent virtual circuit (PVC).

Thereafter, the process terminates. This type of functionality is advantageously placed in the service emulation instance terminator 130, thereby affording a provider the capability to provide switching functionality in components other than conventional switching devices, such as frame relay switches which may need to be replaced over time.

Figure 8:
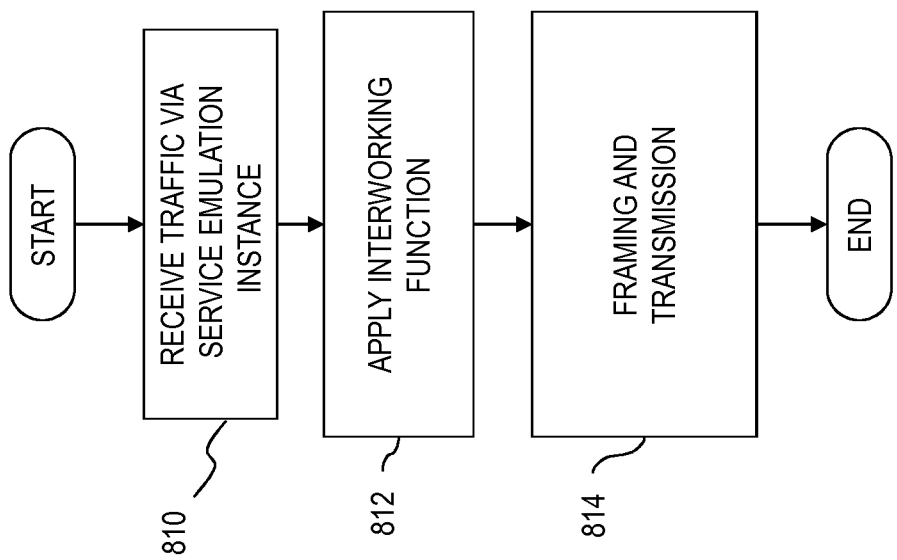
FIG. 8 is a data flow diagram of exemplary steps that may be performed for interworking aggregated flows in accordance with an embodiment of the present invention.

FIG. 8 depicts steps that may be performed by the service emulation instance terminator 130 to perform an interworking function on traffic received via the service emulation instance from the access network and transmit the interworked traffic to the service edge 112. The process begins in step 810, wherein traffic is received via the service emulation instance to an interworking function such as ATM IWF 476 of FIG. 4b. The traffic is received, e.g., by the FR PW termination 420 and decapsulated to its native message format for passing to the switching function via the user network interface. In step 812, the interworking function is applied to interwork the traffic from a first transport to a second transport. The first and second transports may be ATM to Ethernet, Ethernet to ATM, ATM to TDM, frame relay, PPP/HDLC or any other transport combination. In step 814, the traffic is framed and transmitted, e.g., by the Ethernet framer 440 as shown in FIG. 4b.

Figure 9:
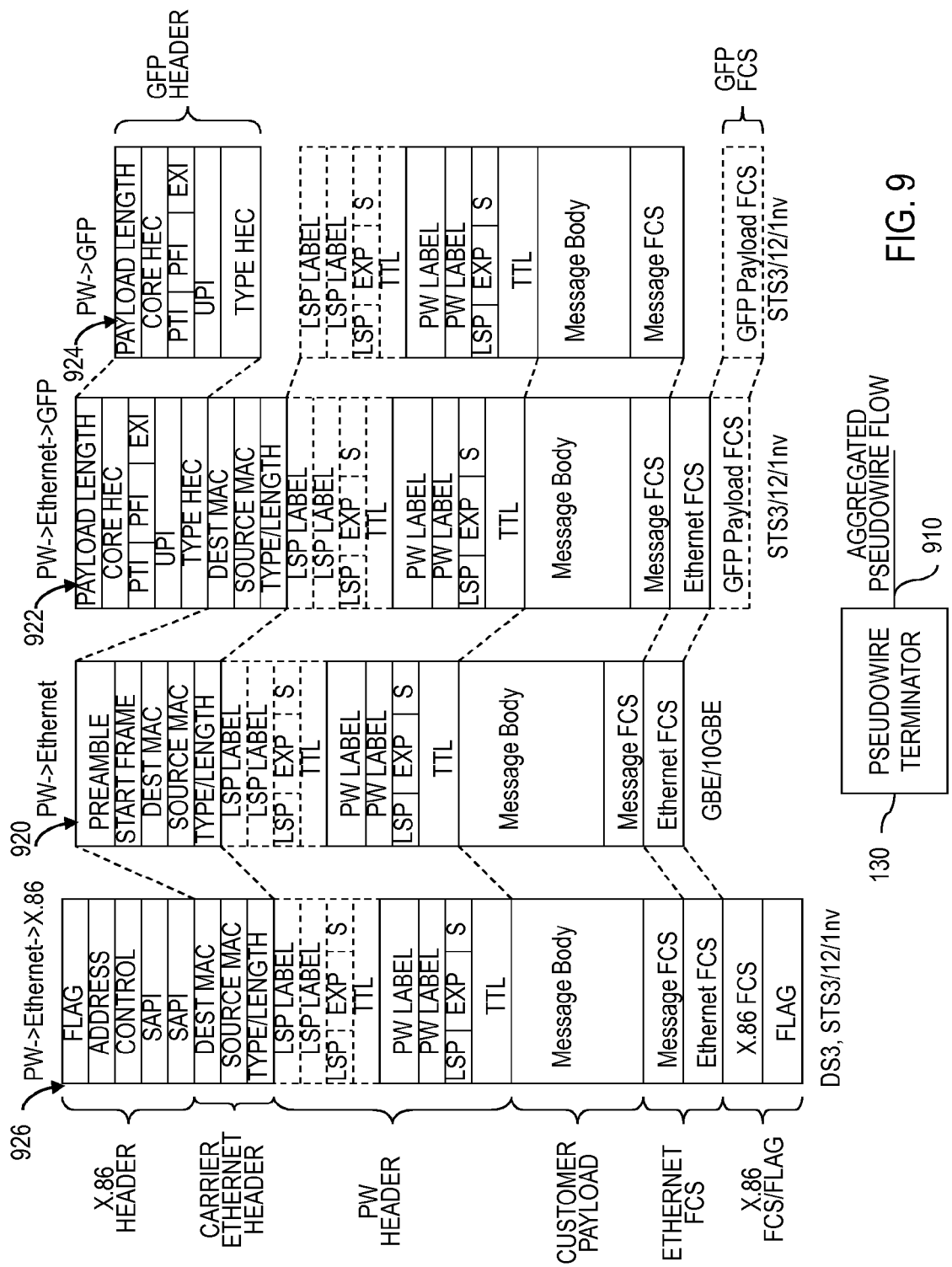
FIG. 9 illustrates framing formats in accordance with an embodiment of the present invention.

FIG. 9 illustrates framing formats in accordance with an embodiment of the present invention. In particular, FIG. 9 illustrates framing formats that may be utilized in an embodiment in which service emulation instances are implemented as pseudowires. The flows received or transmitted by the service emulation instance terminator 130 comprise an aggregated pseudowire flow 910. The aggregated pseudowire flow 910 may comprise pseudowire encapsulated in Ethernet frames 920 over a GbE or 10 GbE link, pseudowire encapsulated in Ethernet frames and GFP frames 922 over a STS-3, STS-12, or STS-1nv link, pseudowire encapsulated in GFP frames 924 over a STS-3, STS-12, or STS-1nv link, pseudowire encapsulated in X.86 frames 926 over a DS-3, STS-3, STS-12, or STS-1nv link, or the like. Other framing protocols and communications links may be used.

Upon receipt of a frame such as those illustrated in FIG. 9, the service emulation instance terminator 130 removes the framing and extracts the tunnel label and/or service emulation instance mapping identifier. The service emulation instance terminator 130, or other network element, utilizes the service emulation instance mapping identifier to determine how the flow is to be handled. Similarly, upon receipt of a flow from the service edge 112, the service emulation instance terminator 130 encapsulates the customer traffic with a pseudowire label (and possibly a tunnel label) and the appropriate framing, such as that illustrated in FIG. 9.

Figure 10:
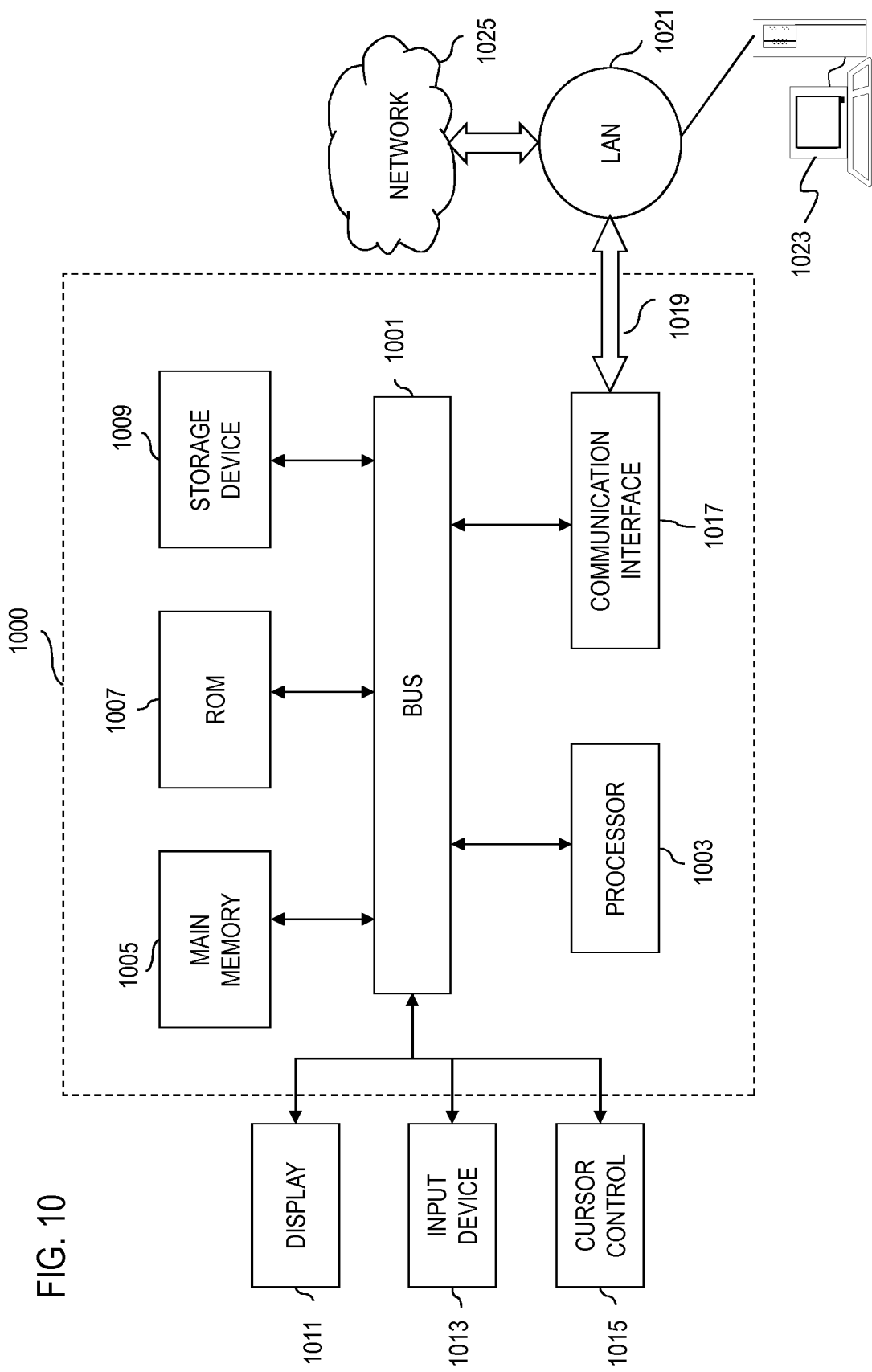
FIG. 10 depicts a computer system that can be used to implement an embodiment of the present invention.

FIG. 10 illustrates a computer system 1000 upon which an embodiment according to the present invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment of the invention, a termination point for a flow in an access network and functionalities of equipment that may be realized in the termination point may be provided, at least in part, by using the computer system 1000 in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the present invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1005 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Co-owned U.S. Provisional Patent Application Ser. No. 60/560,009, filed Apr. 5, 2004, entitled "System and Method for Using Labeled Flows in a Communications Access Network;" U.S. patent application Ser. No. 10/858,502, filed Jun. 1, 2004 and entitled "System and Method for a Communications Access Network;" U.S. patent application Ser. No. 10/858,501, filed Jun. 1, 2004 and entitled "System and Method for Controlling Communication Flow Rates;" U.S. patent application Ser. No. 10/858,503, filed Jun. 1, 2004 and entitled "Method and Apparatus for Processing Labeled Flows in a Communications Access Network;" U.S. patent application Ser. No. 10/858,517, filed Jun. 1, 2004 and entitled "System And Method For Providing A Multiple-Protocol Crossconnect;" and U.S. patent application Ser. No. 10/858,525, filed Jun. 1, 2004 and entitled "System And Method For Managing Communications In An Access Network" are incorporated by reference in their entirety herein.

Thus, while the present invention has been described in connection with a number of embodiments and implementations, the present invention is not so limited but covers various obvious modifications and equivalent arrangements, which fall within the purview of the appended claims.

What is claimed is:

1. A method comprising:
    forwarding a portion of aggregated data received from a first service emulation endpoint of a service emulation instance terminator to a second service emulation endpoint of the service emulation instance terminator, wherein the first service emulation endpoint and the second service emulation endpoint correspond to a customer network and a core network, respectively;
    selectively converting another portion of the aggregated data to a format that is native to another core network,
    wherein the forwarding of the portion of the aggregated data is performed at a switch of the service emulation instance terminator, and the conversion of the other portion of the aggregated data is performed at a framer of the service emulation instance terminator.

2. A method according to claim 1, wherein the aggregated data is from an aggregation system serving a plurality of customer networks including the customer network, the method further comprising:
    receiving the aggregated data as part of an information flow from the aggregation system.

3. A method according to claim 2, wherein the aggregation system is among a plurality of aggregation systems, the method further comprising:
    receiving data from another one of the aggregation systems to be forwarded via the core network.

4. A method according to claim 1, further comprising:
    interfacing with a service edge to communicate with the core network, wherein the core network and the other core network are among a plurality of core networks accessible via the service edge, each of the core networks being associated with a service emulation point.

5. A method according to claim 1, wherein the first service emulation endpoint and the second service emulation endpoint are pseudowire endpoints.

6. A method according to claim 5, wherein each of the pseudowire endpoints corresponds to one or more pseudowires within a tunnel 7. A method according to claim 1, wherein the native format is according to at least one of a Time Division Multiplexed (TDM) and an Ethernet-type data.

8. An apparatus comprising:
    at least one processor; and
    at least one memory including computer program code for one or more programs,
    the at least one memory and the computer program code configured to, with the at least one processor, cause the apparatus to perform at least the following,
        forward a portion of aggregated data received from a first service emulation endpoint of a service emulation instance terminator to a second service emulation endpoint of the service emulation instance terminator, wherein the first service emulation endpoint and the second service emulation endpoint correspond to a customer network and a core network, respectively;
        selectively convert another portion of the aggregated data to a format that is native to another core network,
        wherein the forwarding of the portion of the aggregated data is performed at a switch of the service emulation instance terminator, and the conversion of the other portion of the aggregated data is performed at a framer of the service emulation instance terminator.

9. An apparatus according to claim 8, wherein the aggregated data is from an aggregation system serving a plurality of customer networks including the customer network, and the apparatus is further caused to:
    receive the aggregated data as part of an information flow from the aggregation system.

10. An apparatus according to claim 9, wherein the aggregation system is among a plurality of aggregation systems, and the apparatus is further caused to:
    receive data from another one of the aggregation systems to be forwarded via the core network.

11. An apparatus according to claim 8, wherein the apparatus is further caused to:
    interface with a service edge to communicate with the core network, wherein the core network and the other core network are among a plurality of core networks accessible via the service edge, each of the core networks being associated with a service emulation point.

12. An apparatus according to claim 8, wherein the first service emulation endpoint and the second service emulation endpoint are pseudowire endpoints.

13. An apparatus according to claim 12, wherein each of the pseudowire endpoints corresponds to one or more pseudowires within a tunnel 14. An apparatus according to claim 8, wherein the native format is according to at least one of a Time Division Multiplexed (TDM) and an Ethernet-type data.

15. A system comprising:
    a service emulation instance terminator configured to forward a portion of aggregated data received from a first service emulation endpoint of the service emulation instance terminator to a second service emulation endpoint of the service emulation instance terminator, wherein the first service emulation endpoint and the second service emulation endpoint correspond to a customer network and a core network, respectively;
    selectively convert another portion of the aggregated data to a format that is native to another core network,
    wherein the forwarding of the portion of the aggregated data is performed at a switch of the service emulation instance terminator, and the conversion of the other portion of the aggregated data is performed at a framer of the service emulation instance terminator.

16. A system according to claim 15, further comprising:
    a switch coupled to the service emulation instance terminator and configured to receive the aggregated data from an aggregation system serving a plurality of customer networks including the customer network.

17. A system according to claim 16, wherein the aggregation system is among a plurality of aggregation systems configured to communicate with the switch.

18. A system according to claim 15, wherein the service emulation instance terminator is further configured to interface with a service edge to communicate with the core network, the core network and the other core network being among a plurality of core network accessible via the service edge, each of the core networks being associated with a service emulation point, and a switch coupled to the service emulation instance terminator and configured to receive the aggregated data from an aggregation system serving a plurality of customer networks including the customer network.

19. A system according to claim 18, wherein the aggregation system is among a plurality of aggregation systems configured to communicate with the switch.

20. A system according to claim 15, wherein the service emulation instance terminator is further configured to interface with a service edge to communicate with the core network, the core network being among a plurality of core networks accessible via the service edge, each of the core networks being associated with a service emulation point.

* * * * *